(12) United States Patent
Oliveira

(10) Patent No.: US 10,273,342 B2
(45) Date of Patent: Apr. 30, 2019

(54) PROCESS FOR RECYCLING BY SEPARATING THE CONSTITUENTS OF ALUMINIZED AND PLASTIFIED PACKAGING, CARTONED OR NOT, AND CORRESPONDING EQUIPMENT

(71) Applicant: Juarez Souza De Oliveira, Paraná (BR)

(72) Inventor: Juarez Souza De Oliveira, Paraná (BR)

(*) Notice: Subject to any disclaimer, the term of this patent is extended or adjusted under 35 U.S.C. 154(b) by 40 days.

(21) Appl. No.: 15/528,120

(22) PCT Filed: Nov. 18, 2015

(86) PCT No.: PCT/BR2015/050222
§ 371 (c)(1),
(2) Date: May 19, 2017

(87) PCT Pub. No.: WO2016/077904
PCT Pub. Date: May 26, 2016

(65) Prior Publication Data
US 2017/0342233 A1    Nov. 30, 2017

(30) Foreign Application Priority Data

Nov. 20, 2014  (BR) .......................... 1020140289895
Nov. 17, 2015  (BR) .......................... 1020150288646

(51) Int. Cl.
| | | |
|---|---|---|
| *C08G 63/02* | (2006.01) | |
| *C08J 11/08* | (2006.01) | |
| *C08J 11/06* | (2006.01) | |
| *B09B 3/00* | (2006.01) | |
| *B29B 17/02* | (2006.01) | |
| *C22B 21/00* | (2006.01) | |
| *B29K 705/02* | (2006.01) | |
| *C22C 21/00* | (2006.01) | |
| *F27D 11/06* | (2006.01) | |

(52) U.S. Cl.
CPC ............. *C08J 11/08* (2013.01); *B09B 3/0016* (2013.01); *B29B 17/02* (2013.01); *C08J 11/06* (2013.01); *C22B 21/0069* (2013.01); *B29B 2017/0224* (2013.01); *B29B 2017/0248* (2013.01); *B29B 2017/0251* (2013.01); *B29B 2017/0268* (2013.01); *B29B 2017/0286* (2013.01); *B29B 2017/0293* (2013.01); *B29K 2705/02* (2013.01); *C08J 2323/06* (2013.01); *C08J 2323/10* (2013.01); *C22C 21/00* (2013.01); *F27D 11/06* (2013.01); *Y02P 10/253* (2015.11); *Y02W 30/701* (2015.05)

(58) Field of Classification Search
USPC ................................................. 521/40, 40.5
See application file for complete search history.

(56) References Cited

FOREIGN PATENT DOCUMENTS

| CN | 102166579 A | 8/2011 |
|---|---|---|
| EP | 0644230 B1 | 7/1998 |

OTHER PUBLICATIONS

D.S. Achilias et al., "Chemical recycling of plastic wastes made from polyethylene (LDPE and HDPE) and polypropylene (PP)," Journal of Hazardous Materials, Dec. 2007, pp. 536-542, vol. 149, issue 3.
International Search Report and Written Opinion for PCT/BR2015/050222, dated Jan. 12, 2016.

*Primary Examiner* — Terressa Boykin
(74) *Attorney, Agent, or Firm* — Pilloff & Passino LLP; Sean A. Passino; Rachel K. Pilloff

(57) ABSTRACT

The present patent refers to a process for the recycling and recovery of waste, particularly that of plastified and aluminized packaging, cartoned or not, by means of a method and equipment for extracting and separating the main components present in them for the recovery of waste, avoiding environmental pollution, recycling of waste constituents, and recovery of constituents: Plastic, aluminum and paper in their original form, with the steps A, B, C, D, E, F, G, H, I, J, L, M, O, P, Q e R, bringing advantages of obtaining reusable grade polymer; obtaining isolated aluminum; to make use of a low cost and low energy consuming solvent; to allow the pulp cellulose to be recycled in the production of paperboard for boxes, to be incorporated as part of a mechanical pulp load or even to be incorporated to the bleaching process; to have lower processing and investment costs and to have a lower cost/benefit ratio.

20 Claims, 9 Drawing Sheets

Figure 1:
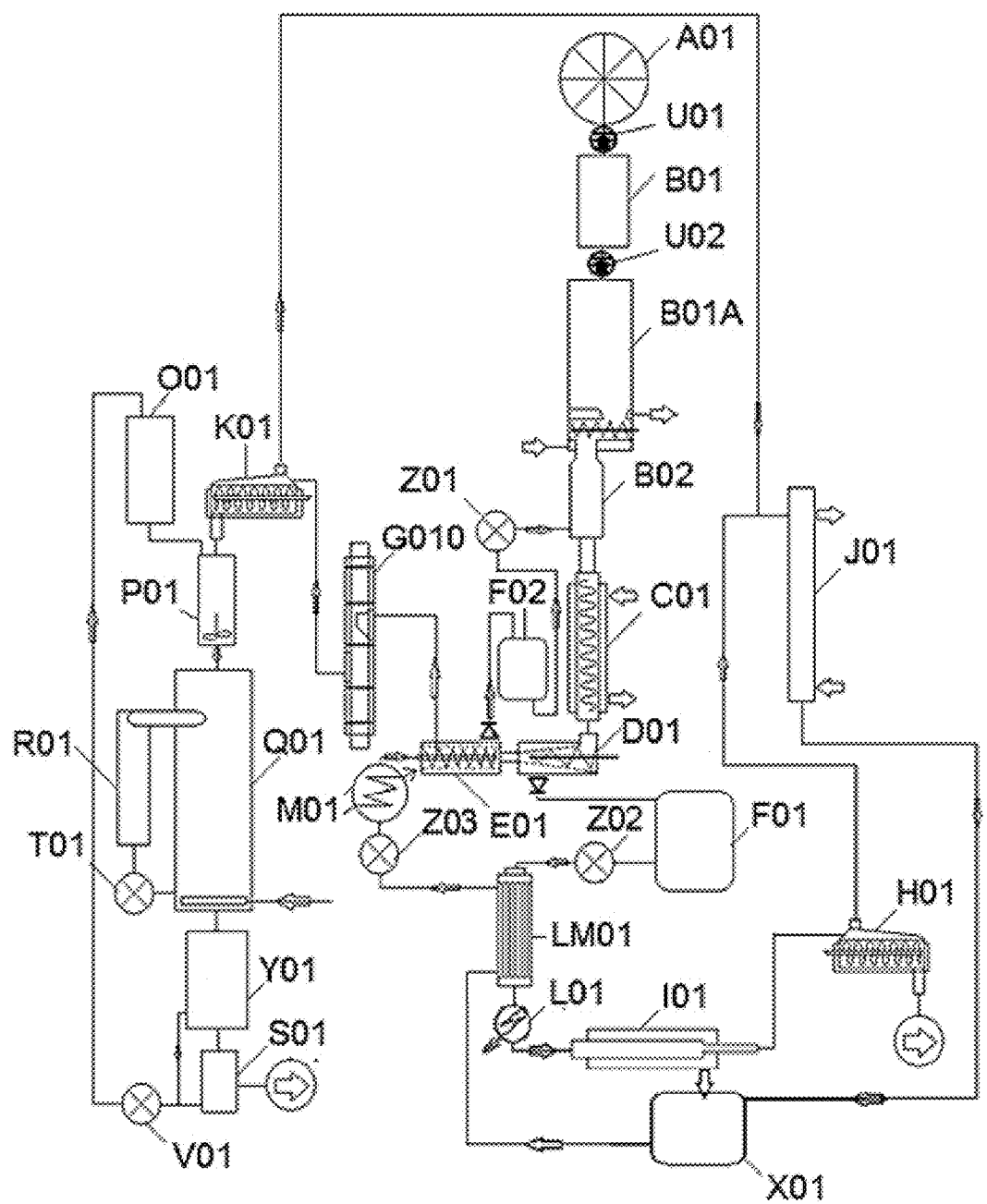

PROCESS FOR RECYCLING BY SEPARATING THE CONSTITUENTS OF ALUMINIZED AND PLASTIFIED PACKAGING, CARTONED OR NOT, AND CORRESPONDING EQUIPMENT

The present application is the United States national stage of international application no. PCT/BR2015/050222, filed Nov. 18, 2015.

The present patent refers to a process for the recycling and recovery of waste, particularly that of plastified and aluminized packaging, cartoned or not, by means of a method and equipment for extracting and separating the main components present in them for the recovery of waste, avoiding environmental pollution, allowing recycling of waste constituents, and recovery of constituents: plastic, aluminum and paper in their original form, bringing advantages of obtaining reusable grade polymer; obtaining isolated aluminum which can be melted and purified by conventional processes such as recycling aluminum cans and other scraps of said metal, or if it is preferred to be used as a raw material for the production of aluminum derivatives such as salts, organoaluminum, or even aluminum pigment. Additional advantages include: to make use of a low cost and low energy consuming solvent; to allow the pulp cellulose to be recycled in the production of paperboard for boxes, to be incorporated as part of a mechanical pulp load or even to be incorporated to the clarification process; to have lower processing and investment costs and to have a lower cost/benefit ratio.

As it is known by the technical means connected with the industry for the use of waste recycling, particularly by packaging industry, the technologies used so far are recovering the cellulose pulp from cartoned, plastified and aluminized packages, which are intended for papermaking. However, the aluminum/polymer composite waste is simply crushed and used to manufacture parts through injection process for the production of artifacts, such as broomsticks, thermal pressing in the manufacture of corrugated tiles, among others. In this way, if the aluminum component is not insulated, its high value as raw material is not exploited. Also known are processes which make use of pyrolysis for subsequent generation of energy, thus leading to the production of liquid and/or gaseous fuels. However, this process, although producing fuel, requires a large amount of energy, said energy provided by the burning of part of the waste itself, since the pyrolysis process involves extremely endothermic reaction.

It is important to emphasize that, as far as packaging is concerned, it is actually a paper/aluminum/polymer sandwich, where the latter polymer component has a softening point of 125° C. and a pour point of 190° C. and consists almost entirely of polymer, which contains in its composition a compatibility additive which promotes better adhesion of low density polyethylene to aluminum. Functionalized polyolefins such as copolymer of ethylene and acrylic or methacrylic acid are normally employed for such a function. These compounds in turn will contribute to improving the compatibility of the recovered material with other thermoplastics, such as polypropylene and polyethylene terephthalate (PET) as well as polyamides such as nylon, thus making future reuse of recovered material more flexible.

Searching the national and international patent banks we find the following revelations:

The Spanish patent PI 2383208 "Procedures for the recycling of aluminum-containing composite materials" discloses a technique which recovers the cellulose by mechanical disintegration of the packages and the residual is then conducted to aluminum recovery.

However, in this process the polyethylene is destroyed, and converted into paraffins and gases. Said process makes use of plasma to conduct the operation which, in addition to leading to the loss of the polymer requires for its operation the consumption of a high amount of energy, since in order to operate the plasma temperatures in the order of 15,000° C. are needed, besides the need to operate in an inert atmosphere, which means high cost.

Various patents employ solvents for recovery of plastics from carton packs: Brazilian patent PI 0202303-2 "Process for separating multilayer films used for packaging" using various solvents including tetrahydrofuran, xylene, toluene, Carbon, organic acids, water, acetone and chloroform; Chinese patent CN 1554691 "Method for separating aluminum in sheets and plastic in films from waste of aluminized plastic packaging" makes use of solvents such as tetralin, tetrahydrofuran in addition to the incorporation of glacial acetic acid, which turns the aluminum into a salt; and Korean Patent KR 20010016352 discloses a process which promotes the reaction of aluminum in the presence of alcohols such as methanol, ethanol, propanol or butanol, associated with chloride salts, such as mercury, calcium, magnesium, aluminum, potassium chlorides or even hydrochloric acid.

These processes use mostly toxic and carcinogenic solvents and reagents, in addition to having a great potential for degradation of the polymer associated or not, to compounds that react with the aluminum, turning it into a salt, taking not only to a high reagent consumption, but also not allowing full recovery of the aluminum in its original metal form.

Other patents disclose other methods of separation, as is the case of the Brazilian patent PI0006641-9 "A surfactant solution used in the process of recycling plastics for cleaning and separation of aluminum", which employs a surfactant and formic acid to remove the polymer film in the range from 85 to 198° C. However, the presence of an acid in the mentioned operating conditions also leads to the consumption of part of the aluminum present in the residue.

Other patents also disclose processes that remove aluminum by chemical reaction, usually employing strong bases or acids:

Brazilian patent PI 0706115-3 "Recycling of multilayer packages", which uses a sodium hydroxide solution in the same manner as U.S. Pat. No. 5,127,958 "Removal of metallic coatings from polymeric substrates".

Chinese patent CN 102532592 "Plastic aluminum separation agents and corresponding preparation method", in turn employs from 5% to 50% of acid associated with 25% to 50% of an unspecified organic solvent. Similarly, Japanese Patent JP 20040327047 discloses separation of the polymers by difference of density in a glycol solution, however, also attacks the aluminum with sodium hydroxide.

It is important to emphasize that in these processes where acids or bases are used, these reagents are consumed, which raises the cost of the process, but also when consuming totally or partially the aluminum, there are economic losses, resulting in products with lower added value.

U.S. Pat. No. 7,598,297, in order to cover other possible processes, comprehensively describes every possible range of solvents, as well as the use of a strong base such as sodium or potassium hydroxide. Likewise, in a wide temperature range. However, in its claims, the only product specifically used is xylene, and operates at different temperatures, in a way that can selectively remove the different naturally occurring polymers in said packages, yet using a strong base which undoubtedly leads to aluminum consumption.

European patent EP 0568791 discloses a wide range of solvents of different natures such as petroleum derivatives (aliphatic, naphthenic aromatics), halogen compounds and mixtures thereof, as well as a wide temperature range of 40° C. to 500° C., in the same way trying to get exclusivity of any process. However, by carrying out the process of separating the constituents using the packages in their composite form, paper, aluminum and polymer, certainly, in addition to the said wide range, it certainly leads to a high consumption of solvent in the process. Said process also explores, among other forms of application, the further step of flowing the solution containing the different polymers dissolved in the different cited solvents to a thermal cracking process operated in the range of 650° C. to 1,200° C. and pressures of 0.1-0.3 MPa.

The processes disclosed in the prior art present the following technical problems, which the present process solved:

1. Some current processes do not recover all constituents in their higher value-added form. The process of the present invention recovers all constituents with reusability;

2. Some processes consume a lot of energy in the melting of aluminum and polymer blends, including breaking down the polymer. The process of the present invention separates the components only with solvent;

3. Some processes require complex and expensive operations for the separation of the polymer from the aluminum. The process of the present invention separates the components only with solvent, conducting the process by operations involving low investment and low cost of raw material; and 4. Some processes use toxic solvents that are difficult to separate and recycle. The process of the present invention utilizes inexpensive, commercially available, non-toxic, fully recycled and low-energy-consuming solvents.

Processes disclosed in the prior art have the following inconvenient, disadvantages and limitations:

a) Some current processes do not recover all the constituents in their higher added-value form;

b) Some current processes, for recovery of the polymer adhered to aluminum, consume other raw materials, which, besides not being recovered to return to the process, generate products of low commercial value;

c) In some processes the separation of the aluminum from the polymer is not carried out, so that the two components are mixed together, in a way that aluminum, a highly-valued component as an isolated compound, enters only as load on the products made with said mixture;

d) Certain processes isolate aluminum, but they do so by consuming a large amount of energy, making use of very high temperature, a condition that leads to the cracking of the polymer that is degraded to the form of a mixture of waxes and volatile compounds of smaller value than that of the polymer, additionally require operation in the presence of an inert atmosphere, which certainly contributes to higher costs;

e) Use of expensive and toxic solvents;

f) High processing and investment costs; and g) Highest cost/benefit ratio.

"PROCESS FOR RECYCLING BY SEPARATING THE CONSTITUENTS OF ALUMINIZED AND PLASTIFIED PACKAGING, CARTONED OR NOT, AND CORRESPONDING EQUIPMENT", has been developed to overcome the inconvenient, drawbacks and limitations of the current processes by means of a method based on solvents for dissolution of polymer in the extraction and separation of the main components present in said packages, for waste reuse, avoiding environmental pollution, allowing recycling of the constituents of the waste and recovery of the constituents in their original form for reuse as plastic, aluminum and paper.

The present patent process has the following advantages over the current processes:

a) The developed process obtains reusable grade polymer for the manufacture of artifacts and films, which may be made up with said recovered product and may therefore be used in its crude form as it has been removed from the process, or else be mixed to another virgin or recovered polymer in the composition of blends which can still receive fillers, pigments or other additives;

b) The aluminum isolated from the process can be carried out in the melting and purification process, as in the conventional processes for recycling aluminum cans and other scraps of said metal, and can thus be used as raw material, either in the production of alloys, sheets, inorganic compounds, such as salts, aluminates, or even organic derivatives such as alkylaluminum;

c) The invention makes use of solvent of easy acquisition in the market and of low cost, since it is not a compound resulting from synthesis, being a distillate fraction of petroleum;

d) By using a solvent that is a fraction of petroleum in narrow range of boiling point and not being incorporated into the product at the end of the process, the recovery thereof is complete since it returns fully to the beginning of the process. The distillation may be conducted in simple equipment requiring no fractional distillation;

e) The characteristics of the solvent: low boiling temperature, low specific heat and low enthalpy of evaporation brings significant emphasis with regard to energy consumption, since only a small fraction is evaporated and almost all of the solvent is recycled without going through distillation, which greatly reduces energy consumption, since most of the solvent is separated by filtration;

f) The process of the invention recovers the polymer keeping its physical and chemical characteristics, including the compatibility additive, which favors the further application of the recovered polymer residue in the formulation of blends with other thermoplastics;

g) The cellulose pulp may be reapplied in the production of carton paper, for the manufacture of boxes, incorporated as part of a filler of mechanical pulp or even go to the clarification process;

h) Lower processing and investment costs; and i) Lower cost/benefit ratio.

The process of the present invention was based on the inventor's knowledge and experience in his former work in research and development of blocks of paraffin and polymer compounds applied as a barrier (moderators) against radiation and later on in the development of explosive compositions, specifically of the emulsion type.

Research has begun to address the need to recycle packaging waste to recover the resulting polymer from the polymer/aluminum residue mechanically processed, which employs hydropulper to recover the waste paper pulp from aluminized packages.

The initial objective was to remove the aluminum by dissolving, and chemical etching, for the production of aluminum salts for use in effluent treatment. The process was also adjusted to obtain aluminates, sulfates and aluminum chloride. The polymer coining from digestion with the acid, or base, would then be washed, and sent to recycling. However, by evaluating the price of said salts, and comparing the flexibility of use of aluminum in its metallic state (reduced), it was decided to evaluate the possibility of removal of the metal without changing it to its oxidized state.

Based on the knowledge of the properties of the polymer, with respect to its chemical structure and similarity with solid paraffins, tests on polymer solubility on solid paraffin were initiated in the following sequence:

In a beaker containing 100 g of solid paraffin, after melting the paraffin and raising the temperature to 100° C., 20 g of films containing aluminum/polymer were incorporated. The temperature was raised to about 125° C. The sample was stirred with a glass rod for five minutes. The entire contents were transferred to another beaker by passing the molten paraffin through a metal sieve. After cooling the contents of the sieve, the sample was washed with cold carbon tetrachloride. Knowing that this procedure solubilizes the paraffin in the cold, but the polymer only if it is heated, it can be verified that the paraffin removed the polymer adhered to the aluminum, a fact proven by tearing the resulting film, which broke without stretching a plastic film, contrary to the behavior of a ripping composite film.

Another finding was that the resulting paraffin/polymer blend, after being heated, solidified at a lower temperature than that of a blank with paraffin alone.

In view of this, it was searched for a way to separate the paraffin from the polymer. It was difficult to solve this issue, because it would not be possible to think of fractional distillation or solubilizing because it was a mixture of high molecular weight compounds. It was therefore thought of to directly use carbon tetrachloride. However, due to its high cost and also high toxicity, its use was discarded.

Other chlorinated compounds were then investigated, but the above cited problems were again present.

Studies were carried out on chlorinated and non-chlorinated, naphthenic aromatic solvents, as well as on alcohol esters, amyl, methyl, butyl acetates, and the like.

In parallel, removal of aluminum adhered to polypropylene, PET and PVC were also tested from different packages, such as blister packs, powdered soft drink packaging, biscuit packs, candies packs, and potato chips packs. For all of these products positive results were achieved for some of the solvents tested. Some of these solvents were studied with more criteria considering the aspect of health risks as well as their accessibility and cost.

However, the main focus remained on carton aluminized packages. In this sense, the tests with the other waste were interrupted and the tests with the latter were continued.

In view of the difficulty of separation when paraffin was used, it was decided to evaluate the use of kerosene, because it has a paraffinic structure similar to the solid paraffin tested. The results obtained using the same mass relations were positive. The dissolution occurred in less than 5 minutes. The next problem then arose: how to eliminate all solvent from the polymer. The residual solvent would probably have in its composition a small quantity of high molecular weight paraffinic compounds, which would require the polymer to be brought to high temperature for effective removal of that residual components. Considering also the sizes of the kerosene chain and of the paraffin chain, strong interactions would be present, factors that make separation difficult.

It was then tried separation by precipitation. The cooled polymer/kerosene solution was a slurry. This slurry was then incorporated into the same volume of ethanol under stirring. The precipitated polymer was then filtered while subjected to successive washes with ethanol. The precipitate was then dried, obtaining the precipitated polymer.

The resulting filtrate solvent mixture was subjected to distillation in order to separate the ethanol from the kerosene. Considering the difficulties in the distillation elimination of the residual kerosene in the precipitated polymer, the sequence was followed for the use of solvent with the same characteristics of the kerosene, but with a lower boiling point.

Commercial hexane was then used, due to the fact that it is a more volatile solvent, the dissolution was made in a glass round-bottom flask, to which was coupled a reflux condenser. The same solvent/residue ratio was used. Five minutes were enough for dissolution to take place.

Another experiment employed petroleum ether, distillation range of 60° C. Difficulty in dissolution was observed, since, unlike the commercial hexane employed in the previous test, the temperature reached in the latter was not sufficient to lead to dissolution.

In a later experiment, due to that observed in the previous test, the same amounts of solvent/residue were placed in a steel tank, which was then closed and placed under heating in hot water. When the water bath reached boiling temperature the tank which was under heating was removed and its cooling was proceeded. When the tank was opened, because its contents were still slightly hot, much of the solvent vaporized from the tank, as a result a polymer sponge was formed. The experiment was then reproduced under pressure in order to operate at the polymer softening. Upon dissolution, the solvent was gradually removed, keeping the dissolver environment warm at the same pressure and temperature, finally obtaining, after cooling, solid polymer.

Thus, after conducting several tests it was concluded that the most suitable solvent for the isolation and separation of polymer from the aluminized and plastified carton packs are the alkanes of low and medium boiling point, therefore of lower molecular weight, because they more easily interact with the large polymer chain and favor, due to its reduced chain size, rapid interaction and consequent dissolution of the polymer, since they readily diffuse between the polymer chains. Also, since the structure of the solvent is linear and similar to the polymer structure, it does not interfere much with the breakage of the same, only occurring the breakdown of Van der Walls forces.

The reason for which the use of normal paraffinic hydrocarbons (linear chain alkanes) was chosen is that they are less toxic than aromatic or even naphthenic, while also minimizing the risk of degradation of the polymer (i.e., as a result of the structural similarity) as well as its easy elimination by evaporation and/or distillation.

The experiments showed the feasibility of using paraffinic hydrocarbon solvents with a boiling point of less than 120° C., preferably 60° C. to 100° C., thus operation temperature is well below the pour point of the polymer which is approximately 190° C., in this way it is observed that it operates at a temperature below the softening point, which is about 105° C., not having to operate with such high pressures. The ease of dissolution and the consequent flexibility of its elimination when returning to atmospheric pressure leads to a better final quality of the recovered polymer. To overcome the dissolution temperature problem, when it is below the softening temperature of the polymer, it was operated with increasing pressure thus reaching the ideal process temperature which is the softening temperature of the polymer.

With regard to solvent separation, as its boiling point was below the polymer softening point, when the solution left the dissolution equipment, part of the solvent evaporated, however, before removing the aluminum, and after removal of the solution containing most of the polymer, new solvent (distilled) was added, that washed the aluminum. This solvent, which was still hot, was used as the first solvent in the next batch, thus also optimizing the solvent recovery process.

The solution containing the polymer, after partial concentration due to the partial evaporation of the solvent, whose vapors were conducted to the condenser, was then conducted to the subsequent step.

Finally, the last sequence of experiments was evaluating the filtration techniques. It is known that in ultrafiltration (used for emulsions, bacteria, fats and macromolecules), the operating pressure range is between 1 to 10 bar, the pore membranes having 0.001 to 0.1 µm, the average molecular weight of the Polymer 200,000 Da. This technique could be promising, as well as the possibility of rational use of energy, for example. Use of gases from a boiler, leaving the chimney with a temperature around 250° C., gases that could be led to the evaporation tower or polymer drying belt. In case that aluminum is molten to be recovered as aluminum ingots, the air from the ingot cooling heat exchanger would exit at an initial temperature of 650° C. and the final temperature could be in the range of 125° C., thus making proper use of energy.

Pressure filtration of a solution with 11% polymer dissolved using filter paper on a porous ceramic plate was tested initially and the solvent was observed to migrate by capillarity and the more concentrated polymer was retained on the paper.

In another essay the solution was subjected to ambient cooling and subsequent filtration on paper, applying manually a light pressure with syringe-shaped equipment and it was observed that the solvent was easily separated. Subsequently, the wet cake wrapped in paper was pressed using a press, the formed pie was left with very little solvent. In this way it was evident that the separation process can be efficiently improved, consequently saving energy, filtering the solution hot and subsequently subjecting the cake to a compression on the filter surface. Although the paper filter is employed, the cake is easily freed from this and subsequently the crumbled material can be subjected to final drying with complete elimination of the residual solvent, with or without prior washing.

The minimum time required for dissolution of the polymer associated with the aluminum film of the Tetra Pack® packages was also verified. For this reason, the residue of these packages with the already removed cellulose were solubilized in kerosene and kept at 100° C. With the use of tweezers, pieces of the film measuring approximately 30 mm×30 mm were immersed in the hot solvent and, proceeding lightly, were removed after different time intervals: 2, 4, 6, 8, 10, up to 20 seconds. Each individual piece, immediately after emanating from the heated kerosene, was then immersed in another beaker, which contained cold petroleum ether. This procedure was aimed at rinsing, that is, removing the residual solution that would involve the films and also facilitating the subsequent elimination at low temperature. To verify the efficiency of the dissolution process, each sample piece was subjected to tearing. It is noted that the aluminum/polymer film upon being subjected to this procedure stretches as a film of fissured aluminum still adhered to an extended polymer film. As a result of the tests, it can be observed that even those pieces held only for two seconds immersed in the solvent showed removal of the polymer, a fact evidenced by the fragility of the same during tearing. In view of this it can be stated that the time required for solubilizing the polymer is extremely low. This is due to the large area of film, associated with its reduced thickness. However, to ensure that the entire polymer is removed it is desirable to keep the submerged material for a longer time, especially to ensure the dissolution of thicker layers that are present, as in the case of the boxes gluing regions where film layers overlap. It is also important that the lids are removed in the case of the disintegration of the cartons, since if present in the dissolution phase, they will require a much longer heating time. However, if not removed, they shall accompany the aluminum and be mechanically removed from the mixture of aluminum/polymer sheets and lids, via sieving or grating. The agitation is also of fundamental importance to favor the diffusion of the solvent and also to facilitate the disaggregation of the residues, which, due to the previous process, are crushed and aggregated.

Briefly, the new process brings the following new features:

1. Use of dissolution of the polymer with a solvent of the lower- and middle-boiling point alkanes family, therefore having a lower molecular weight, preferably paraffinic hydrocarbons having a boiling point of less than 100° C., preferably from 60° C. to 120° C. For example, in this new process it can be used kerosene, but operating at just 105° C., well below its boiling temperature, well below its flash point, presenting advantage of low flammability at this temperature. Subsequently, removal of residual kerosene at cold, through washing the solution with a hydrocarbon of reduced boiling point, which will at the end be easily eliminated. These hydrocarbons readily interact with the large polymer chain, favoring, due to their small chain size, rapid interaction and consequent dissolution of the polymer, since, due to their small chain length, they easily enter and diffuse between the polymer chain, and still being of similar structure little interferes with regard to the breaking of the same, occurring only the breakdown of forces of Van der Walls;

2. Operation at temperatures well below the melting point of the polymer which is approximately 190° C., in this way it is observed that it operates at the temperature below the softening point, which is about 125° C., with no need to operate under pressure. This novelty also has the advantage, in the subsequent operation, of easy disposal and consequent recovery of the solvent employed when subjected to atmospheric pressure;

3. Separation of the aluminum from the polymer/aluminum-rich residue by dissolution of the polymer in recirculating solvent, with concentration of the polymer in the solution during its residence time;

4. Separation of the Polymer and solvent from the concentrated polymer-rich solution by obtaining reusable polymer and solvent recycled in the process itself;

5. For the removal of the residual dissolving solvent in aluminum, it is used a washing solvent chosen from low boiling hydrocarbons, in its preferred form it is the hydrocarbon fraction in the commercial hexane distillation range, or petroleum ether, or alternatively 96° GL ethanol;

6. The process requires reduced dissolution time, therefore it is feasible to operate continuously, which leads to the reduction of the size of the dissolution equipment, and can be effected, either through screw conveyors, belt conveyors with immersion on the solvent, pumping, associated with filtration, either with cooling or not, if ultrafiltration is adopted, devices such as extruders whose jacket wall is the filter element, or any set of constructive arrangement that is capable of performing unit operations continuously or even the association of continuous operations with batch operations;

7. Optimization of the process with regard to energy, if the entire recovery chain is contemplated, such as separation of pulp from paper, polymer and aluminum, by recovering heat between the process phases, for example gas recovered from e.g. a boiler outlet (chimney) at 250° C., said gases supplied to the tower or belt for drying of the polymer after evaporation of the washing solvent. In case that the technological solution includes aluminum melting, cooling of the ingots could be performed in a chamber whose hot gases from the cooling would recover heat from the aluminum and could be conducted either for heating part of the solvents or even to be used for general drying, either of the composite films after elimination of the cellulose, before entering the solubilization process, drying of the powdered polymer after elimination of the washing solvent. This is in fact feasible because, we would have hot gases with initial temperature of 650° C. and final temperature could be in the range of 105° C.;

8. Optionally the separation of the solvent from the polymer can be carried out by distillation process, in batch operation, where the addition of new (distilled) solvent before removal of the aluminum from the dissolution equipment, leading to the washing of the aluminum, thus removing residue of solubilized polymer adhered thereto. Its subsequent use as the first solvent for the next batch, not only provides the efficient consumption of the solvent itself, but also leads to a greater and more efficient recovery of the polymer;

9. Obtaining the recovered polymer, without the need for reprocessing by melting, in order to avoid additional processing time due to re-melting;

10. Alternatively, forming a polymer film parallel to solvent recovery through a steam heated roller tower process, said film being able to be crushed or not immediately after its formation;

11. Alternatively, isolation of the polymer contained in the solution by injection of the pre-concentrated solution, in a rotating disk and in a spray-dryer type chamber; and 12. Obtaining of the polymer precipitated by the incorporation of a second solvent.

Figure 2:
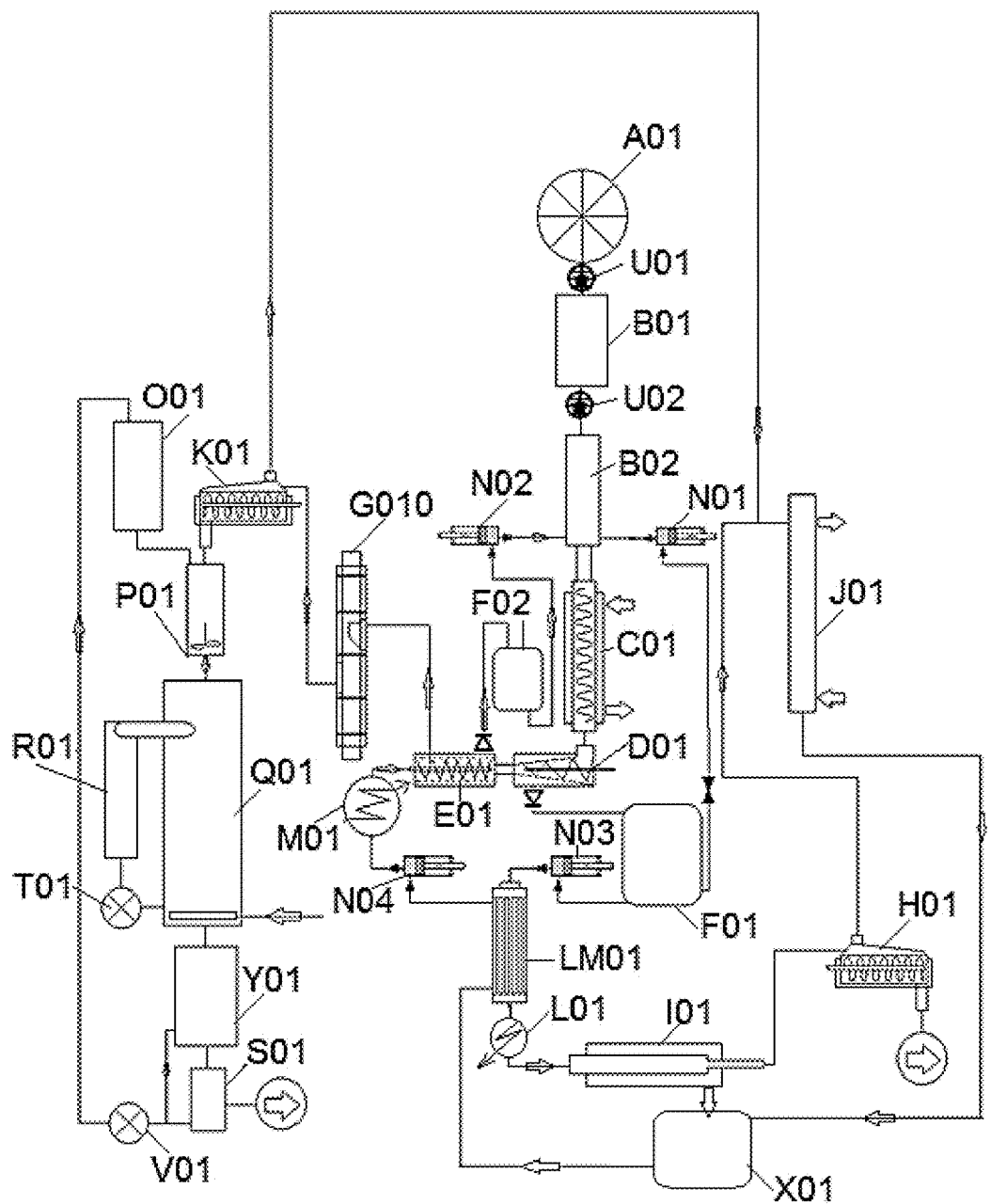
Figure 3:
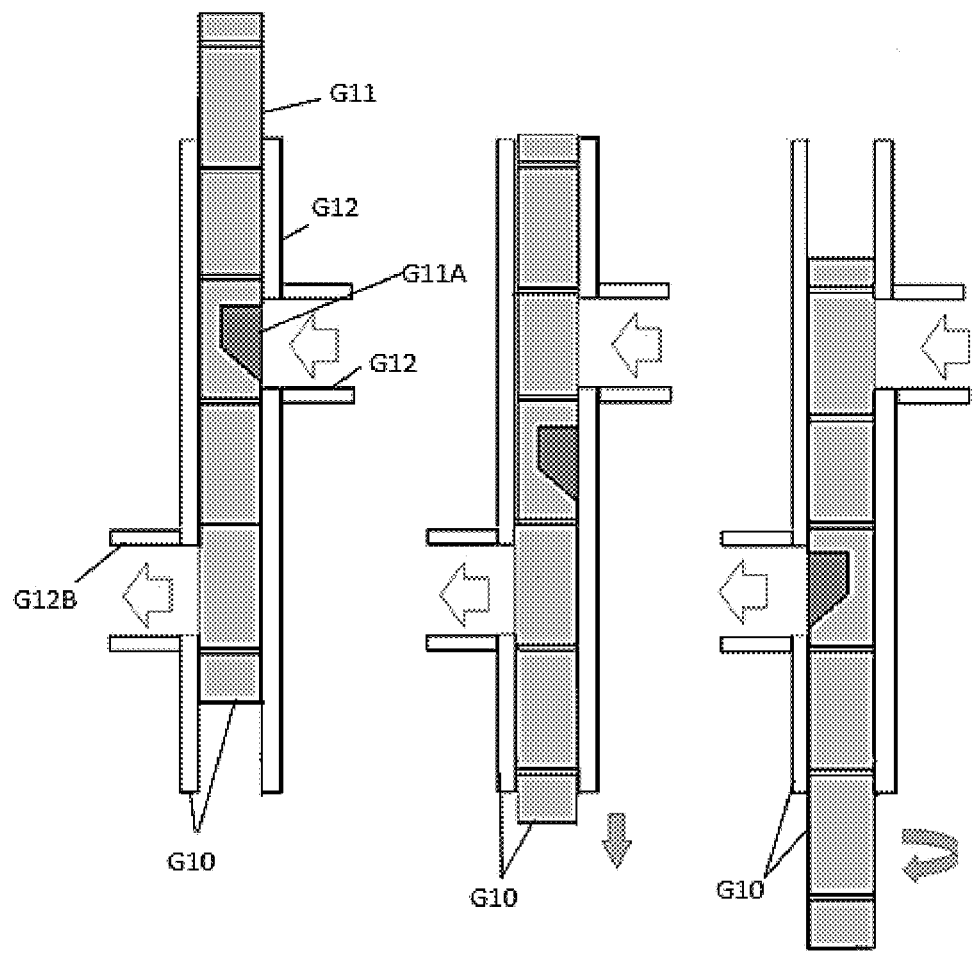
Figure 4:
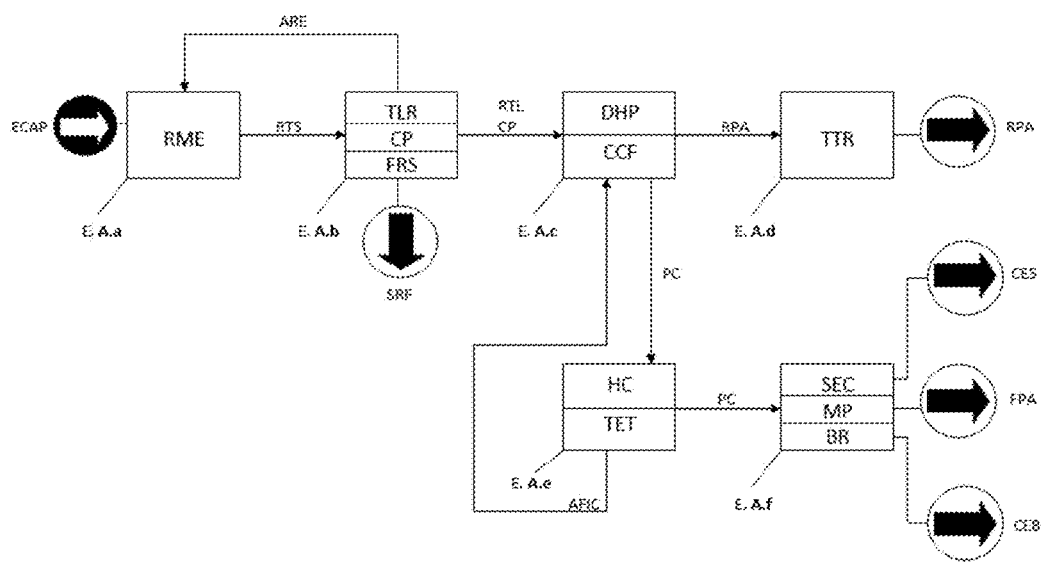
Figure 5:
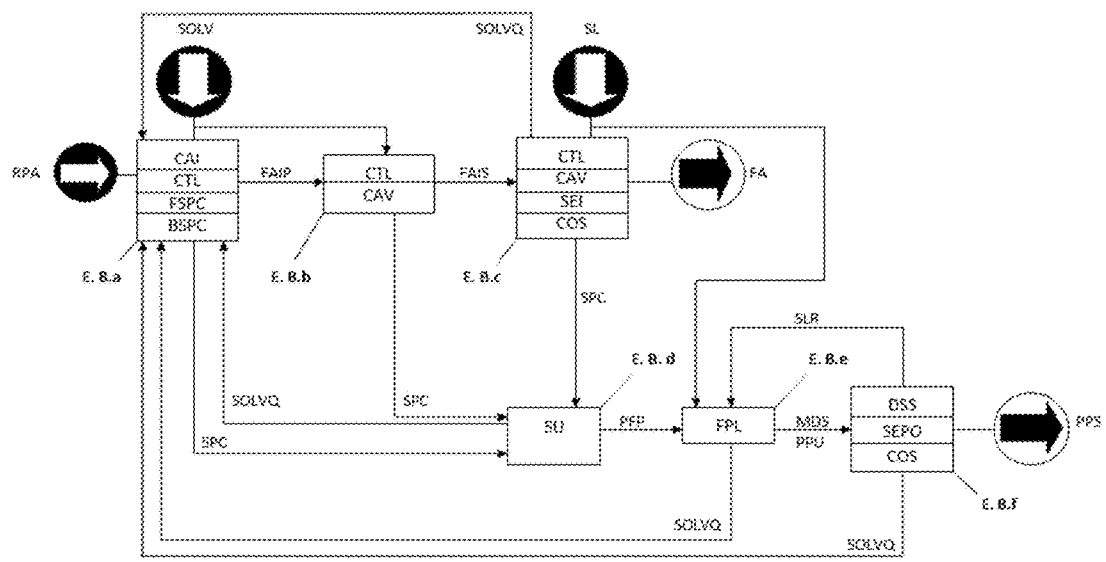
Figure 6:
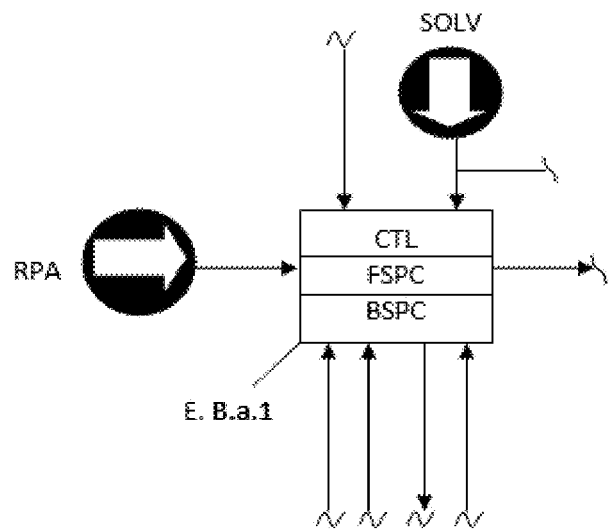
Figure 7:
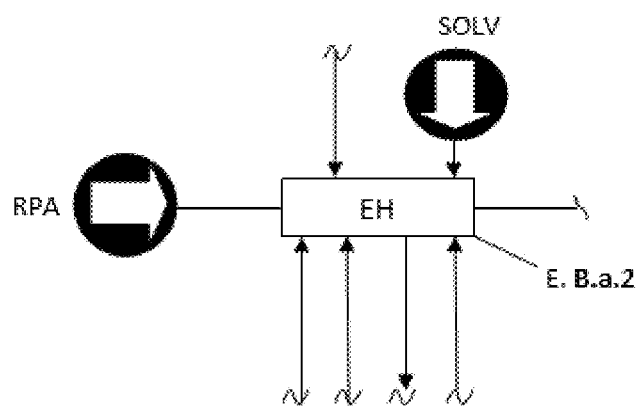
Figure 8:
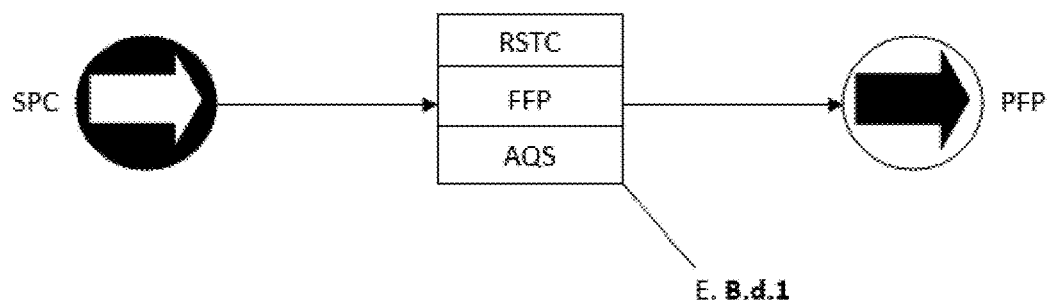
Figure 9:
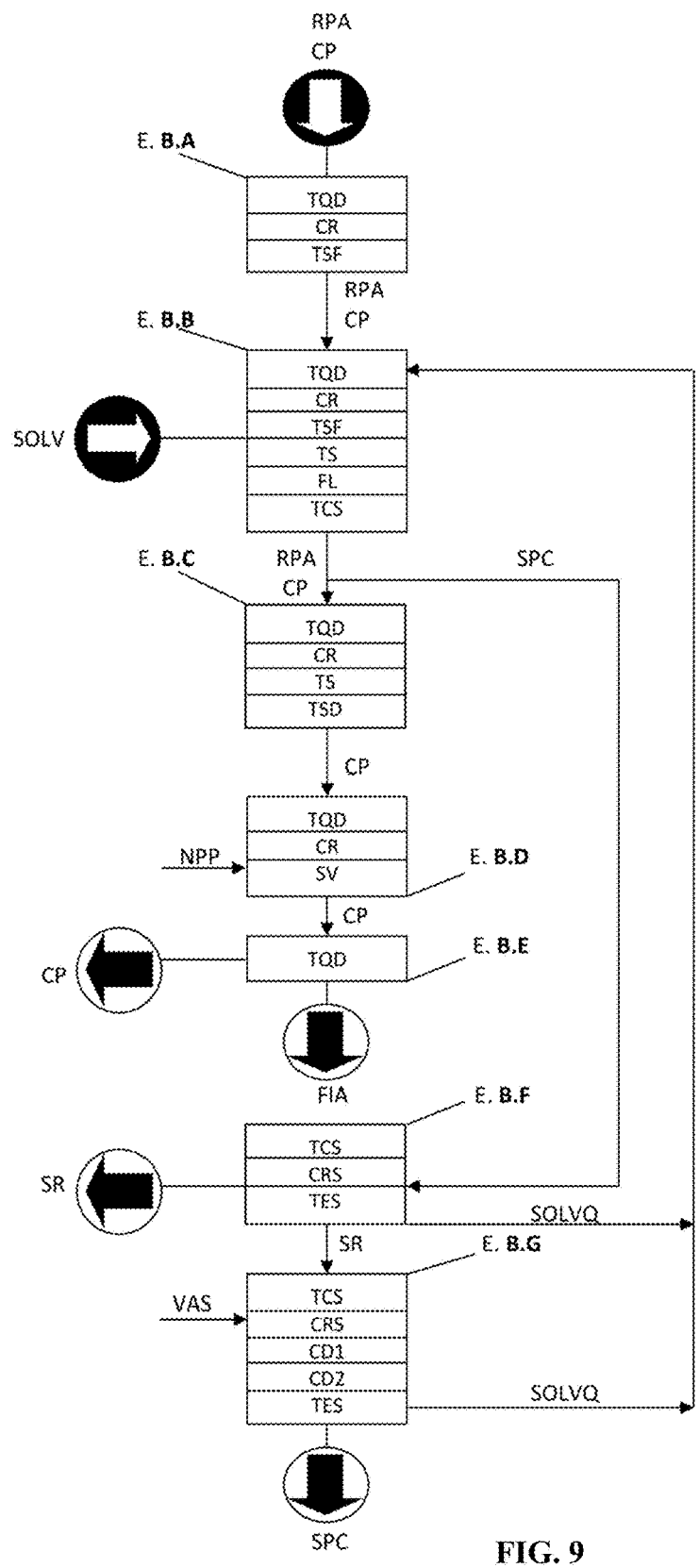
Figure 10:
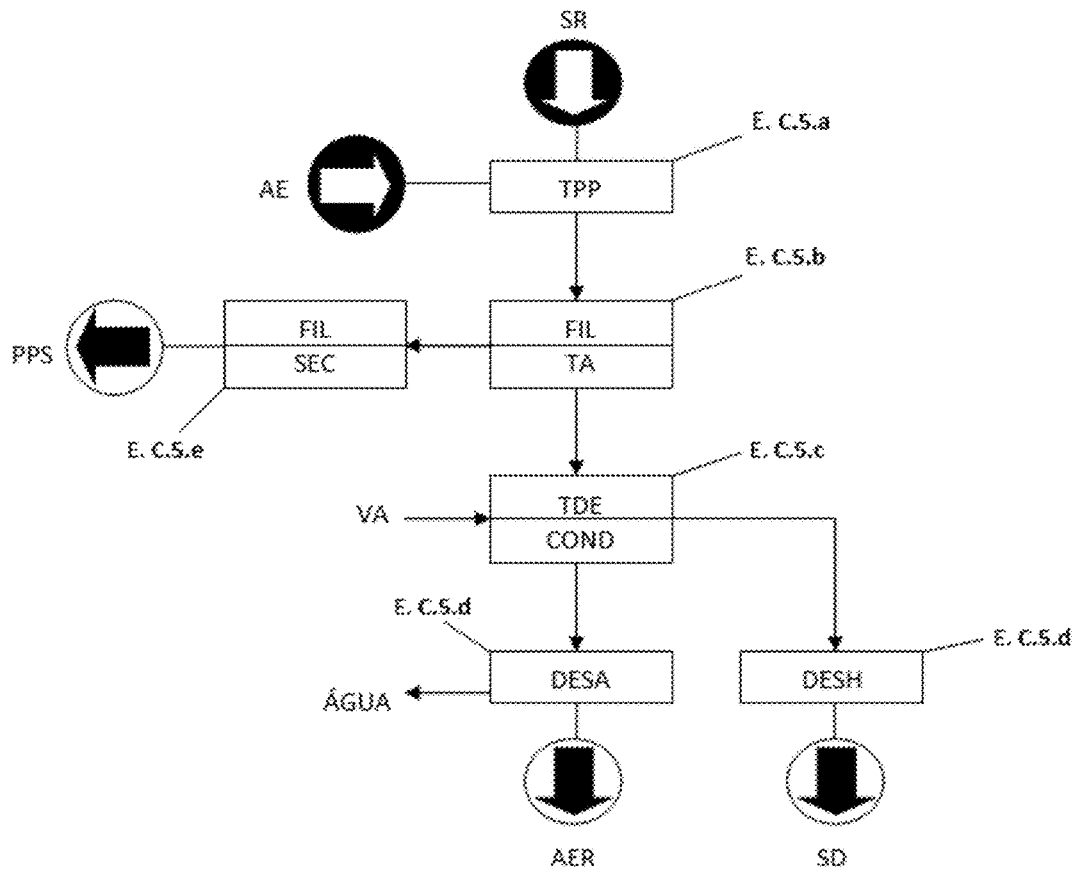

For a better understanding of the present invention, the following figures are attached:

FIG. 1., showing the flowchart of the continuous process for recycling by separating the constituents of aluminized and plastified packaging, cartoned or not, from the present patent;

FIG. 2., showing the flowchart of the intermittent process for recycling by separating the constituents of aluminized and plastified packaging, cartoned or not, from the present patent;

FIG. 3., showing the schematic view of the special aluminum output equipment in three operating positions;

FIG. 4., showing the block diagram of the process and equipment in step A for separating the cellulose from the aluminized and carton packages of the present patent;

FIG. 5., showing the block diagram of the process and equipment in its preferred form in step B for separation and insulation of aluminum and the polymer-rich polymeric composition contained in the aluminum/polymer blend;

FIG. 6., showing the block diagram of the process and equipment for the first alternative of step B.a for separation and isolation of aluminum and of the polymer-rich polymeric composition contained in the aluminum/polymer blend;

FIG. 7., showing the block diagram of the process and equipment for the second alternative of step B.a for separation and isolation of aluminum and of the polymer-rich polymeric composition contained in the aluminum/polymer blend;

FIG. 8., showing the block diagram of the process and equipment for the alternative of step B.d for separating the polymer from the concentrated polymer-rich solution;

FIG. 9., showing the block diagram of the alternative process for performing the entire step B of the process for separation and isolation of the aluminum and the polymer-rich polymeric composition contained in the aluminum/polymer blend; and FIG. 10., showing the block diagram of the process in step C in option C.1, for obtaining the polymer in the form of a dry precipitate.

For a better understanding of the process, we have established the following identifications of the currents and equipment:

A01 - Film doser
B01 - Intermittent feeder
B01A - Continuous feeder
B02 - Suspension tank
C01 - Dissolver tank
D01 - Special screening filter
E01 - Residual polymer washing tank
F01 - Concentrated solution tank
F02 - Diluted solution tank
G10 - Special aluminum output device
G11 - Plunger
G11A - Cavity
G12 - Jacket
G12A - Top opening
G12B - Bottom opening
H01 - Polymer dryer
I01 - Slurry filter
J01 - Solvent vapor condenser
K01 - Aluminum dryer
L01 - Concentrated solution cooler
LM01 - Heat recovery unit
M01 - solvent heater
N01 - Concentrated solution feeder
N02 - Return solvent feeder
N03 - Concentrated solution feeder
N04 - Solvent feeder
O01 - Kerosene tank
P01 - Aluminum crusher
Q01 - Flotation tank
R01 - Screen basket
S01 - Press
T01 - Recirculation pump
U01 - Valve
U02 - Valve
V01 - Return pump
X01 - Solvent tank
Y01 - Drain filter
Z01 - Washing solvent feeding pump
Z02 - Concentrated solution pump
Z03 - Solvent pump
ECAP - Cartoned, aluminized, and plastified packages
RME - Mechanical shredder
RTS - Dirty shreds
TLR - Shreds washing tank
CP - Perforated baskets
FRS - Dirt removal filters set
SRF - Dirt retained in the filters Set
ARE - Recovered Water
RTL - Clean shreds
DHP - Disaggregation in Hidrapulper disaggregator
CCF - Fixed cylindrical basket
RPA - Residue of polymeric composition rich in aluminum/polymer
PC - Cellulose pulp TTR - Inclined rotating screening drum
HC - Hydrocyclones
TET - screening belt conveyor
AFIC - Cellulose-free filtered water
SEC - Dryer
CES - Dry cellulose
MP - Paper machine
FPA - Paper sheets
BR - Bleacher
CEB - Bleached cellulose
SOLV - Recovered dissolving solvent
CAI - Inclined trough
CTL - Screening conveyor belt
FSPC - Filter of polymer-rich concentrated solution
BSPC - Pump of polymer-rich concentrated solution
SPC - Polymer-rich concentrated solution
SPD - Polymer-rich diluted solution
FAIP - Aluminum sheets impregnated with polymer and solvent
CAV - Vacuum chamber
FAIS - Aluminum sheets impregnated with solvent
SL - Washing solvent
SEI - Lower dryer
COS - Solvent condenser
FA - Aluminum sheets
SOLVQ - Hot recovered dissolving solvent
SU - Ultrafiltration separator
PFP - Polymer in slurry form
FPL - Press filter with washing
MDS - Blend of solvents
PPU - Wet Polymer Powder
DSS - Solvent simple distiller
SEPO - Polymer dryer
SLR - Recovered washing solvent
PPS - Dry polymer powder
CTL - Screening belt conveyor
DSPC - Solution filter
BSPC - Solution recirculation pump
EH - Hildebrand Extractor
RSTC Solution cooling heat exchanger
FFP - Press Filter
AQS - Solvent Heater
PFP - Polymer in slurry form
TQD - Dissolution tank
CR - Reflux condenser
TSF - Thermosiphon
TS - Solvent Tank
FL - in-line Filter
TCS - Solvent Concentration Tank
TSD - Dilute Solution Tank
TES - Solvent stock tank
SV - Vacuum System
NPP - Nitrogen for Purge
FIA - Aluminum Film
CRS - Reflux Condenser
SR - Resulting Solution
VAS - Saturated Steam
CD1 - Condenser 1
CD2 - Condenser 2
VA - Steam
TPP - Precipitation Tank
FIL - Polymer Filter
TA - Tank with Water
PPS - Dry Precipitated Polymer
TDE - Decanting Tower
COND - Condenser
DESA - Ethanol Distiller
DESH Dissolving Solvent Distiller
AER - Recovered Ethanol In the search for improvements in the process and in the choice of equipment, options were studied and results were obtained, leading to optimizations, as follows:

Process for recycling by separating the constituents of aluminized and plastified packaging, cartoned or not, consisting of separating the constituents of polyethylene or polypropylene plastic film with aluminum by solubilizing the polymer in a compatible primary solvent, operation performed below the polymer softening temperature and under pressure followed by insolubilization via reduction of temperature or by incorporation of a secondary solvent with affinity with the primary solvent and non-solvent of the polymer, separation of the solvent from the polymer and finally filtration and reuse of the solvent in the step of solubilization, in a continuous process, in the following sequence:

A) Feeding of small shreds of film or equivalent in an intermittent form, through the film doser (A01), passing through a locking valve (U01) at the inlet of the intermittent feeder (B01) and from it through another locking valve (U02) at the inlet of the continuous feeder (B01A);

B) Dosing of a predetermined quantity of film from the intermittent feeder (B01) with the valve (U01) blocked and the valve (U02) open, transferring the film to a continuous feeder (B01A); the valve (U02) is blocked and the valve (U01) is unlocked and film is re-fed from the doser (A01) into the intermittent feeder (B01), and so on;

C) Film from the continuous feeder (B01A) is fed through its internal conveyor thread, concomitant with the solvent inlet, into the suspension tank (B02) with the valve (U02) blocked, with continuous volumetric feed of solvent through the solvent feeding pump (Z01) in a ratio of 8 to 15 parts of solvent to one part of film, so as to cover the entire film content in the suspension tank (B02) and formation of a suspension of the polymer/aluminum film in solvent;

D) Feeding of the suspension in the dissolver tank (C01) where the suspension is rotated by a profile in the shape of an internal helical pitch and heating at 100 to 105° C. in an indirect way and with greater circulation, agitation and consequent movement for better convection, with a residence time of 2 to 5 seconds;

E) At the end of the dissolution, the liquid stream with the solution of polymer and aluminum in suspension, enters a special screening filter (D01) carried by a helical thread, which conducts the aluminum through the filtration operation and separates the concentrated solution;

F) The concentrated solution crosses the walls of the screen maintaining a counter pressure to the fluid in the solution outlet to keep the dissolver tank (C01) pressurized and is collected in the concentrated solution tank (F01) and the aluminum with residual polymer flows, pushed by the thread of the filter (D01), to another contiguous compartment, the residual polymer washing tank (E01) and immediately before and after the wall communicating the two compartments, the duct no longer allows passage through its surface and using different speed the aluminum is driven to the special aluminum output device (G10) out of the system;

G) In the Residual polymer washer tank (E01), filtered and condensed solvent is injected from the solvent tank (X01), through the inside of the helical screw thread of the tank (E01), to remove residual polymer solution from aluminum and the diluted solution crosses the screen maintaining a counter pressure to the fluid in the solution outlets to maintain pressurized the dissolver tank (C01) and is collected in the diluted solution tank F02;

H) The concentrated solution, after reaching the steady state, is collected in the concentrated solution tank (F01) and transferred continuously by the concentrated solution pump (Z02) for cooling between 50 and 70° C., initially in the heat recovering unit (LM01) to yield heat to the filtered and condensed solvent, and additionally to the concentrated solution cooler (L01) in order to precipitate and insolubilize the polymer, then to filtrate into the slurry filter (I01), from which the filtered solvent is accumulated, together with solvent from the condenser (J01) into the solvent tank (X01) and returning through the heat recovering unit (LM01), the solvent pump (Z03), the solvent heater (M01) and the shaft of helical thread of the residual polymer washing tank (E01);

I) The diluted solution from the washing of the aluminum in the residual polymer washing tank (E01) is collected in the diluted solution tank (F02) and returned to the beginning of the process continuously through the washing solvent feeding pump (Z01);

J) The cake after filtration goes to drying in the polymer dryer (H01) and the solvent vapors proceed to the condenser (J01) and the resulting condensed solvent is mixed with the condensed solvent coining from the aluminum dryer (K01);

L) All solvent vapor streams, after condensate, proceed to the solvent tank (X01), are reused for washing the aluminum and from there to the beginning of the process;

M) Aluminum is intermittently removed through a special intermittent, rotating and reciprocating vertical opening and closing aluminum output device (G10) in order to also keep the pressure inside the dissolver tank (C01) and the aluminum from which the polymer was removed is conducted for drying in the dryer (K01), the solvent vapors being separated to the condenser (J01), where its stream is mixed with the condensed solvent from the polymer dryer (H01);

O) Dry aluminum containing small amounts of cellulosic fiber and pieces of unremoved lids, as well as polypropylene tapes, in batch process, are fed into a crusher tank (P01), kerosene is added at room temperature and shear crushing is carried out, not only removing the polymer residual, but also loosing all the residual cellulosic fibers;

P) The agitation is then turned off and the aluminum suspension is transferred to the flotation tank (Q01), air is sprayed through the device contained in the bottom of the crushing tank (P01), occurring the formation of foam which carries fibers and shreds of polypropylene and cellulosic fibers;

Q) This foam is continuously removed by the draining of the supernatant liquid stream, foam passing through a screening basket (R01), where the light particulates of polypropylene and fiber will be retained, then returning the kerosene to the tank, by pumping through the recirculation pump (T01) to the tank bottom; and R) The aluminum suspension, after the impurities are eliminated, is drained by a filter (Y01), the kerosene is pumped by the return pump (V01) and returns to the kerosene tank (O01) which will feed the next batch and the aluminum goes for pressing in the press (S01) to remove most of the kerosene, which goes to the melting stage, where evaporation of the remainder of retained kerosene takes place.

Alternatively, the optimized process may be performed intermittently with the following modified steps:

A) Feeding of small shreds of film or equivalent, in an intermittent form, through the film doser (A01), passing through a locking valve (U01) at the inlet of the intermittent feeder (B01) and from it through another locking valve (U02) at the inlet of the suspension tank (B02);

B) Once the valve (U01) is blocked between the film doser (A01) and the intermittent feeder (B01), the film is dosed concomitantly with the solvent feed in the suspension tank (B02) and with each intermediate tank feed (B01), the valve (U02) between it and the suspension tank (B02) is held closed;

C) Intermittent volumetric feed of concentrated solution through the concentrated solution feeder (N01) and washing solvent through the return solvent feeder (N02) effected by positive displacement, the first working only until entry into steady state, in a ratio of 8 to 15 parts of solvent to one part of film, so as to cover the entire film content in the suspension tank (B02) and formation of a suspension of the polymer/aluminum film in solvent;

H. The concentrated solution, after reaching the steady state is collected in the concentrated solution tank (F01) and transferred intermittently by the concentrated solution feeder (N03) for cooling between 50 and 70° C., initially in the heat recovery unit (LM01) to give heat to the filtered and condensed solvent and is further cooled in the concentrated solution cooler (L01) in order to precipitate and insolubilize the polymer, then to filtrate in the slurry filter (I01), from which the filtered solvent is accumulated together with solvent (J01) into the solvent tank (X01) and returns through the heat recovery unit (LM01), through the solvent feeder (N04) intermittently, through the solvent heater (M01) and by the shaft of the helical thread of the residual polymer washing tank (E01); and I) The diluted solution from the washing of the aluminum in the residual polymer washing tank (E01) is collected in the diluted solution tank (F02) and returned to the beginning of the process intermittently through the return solvent feeder (NO2).

In order to carry out the process for recycling by separating the constituents of aluminized and plastified packaging, cartoned or not, in a continuous process, the following equipment was adopted: film doser (A1) volumetric, of the rotary valve type or of the thread conveyor or of the belt conveyor type; Intermittent feeder (B01) of cylindrical shape and conical bottom, placed between the continuous feeder (B01A) and the film feeder (A01) and with the diaphragm type locking valve (U01) at the inlet; Continuous feeder (B01A) of cylindrical shape and conical bottom with internal conveyor thread, with diaphragm-type locking valve (U02) at the inlet and with tangential solvent feed connection; Dissolver tank (C01) with cylindrical section and heating jacket, having in its interior, along its vertical section, a fixed helical pitch involving all the circular transverse section; Special screening filter (D01) conical-shaped, fitted with a conical helical thread adjusted to the wall of the screen and check valve at the outlet to the concentrated solution tank (F01) and communicating with the residual polymer washing tank (E01) through non-screening duct leading to the other compartment; Residual polymer washing tank (E01) of screened duct of cylindrical configuration and with a larger cross-section and containing inside it a cylindrical helical thread with perforations on its shaft and check valve at the outlet to the diluted solution tank (F02); Concentrated solution tank (F01); diluted solution tank (F02); Special aluminum output device (G10) rotative and pulsatile with plunger (G11) which moves inside a cylindrical jacket (G12) with top opening (G12A) connecting to the pressurized system, and another bottom opening (G12B) located below, said bottom opening (G12B) distant from the top opening (G12A) by a length a little larger than the height of the top opening and 180 degrees out of the top opening and in communication with external means, the plunger (G11) has a cavity (G11A) of semi-cylindrical shape with the lower cut inclined at 45 degrees and delimited by three top sealing rings and three other equidistant rings below, situated at a distance a little larger than the corresponding height of the cavity; Polymer dryer (H01) of conveyor thread type with indirect heating: aluminum dryer (K01) of the conveyor thread type with indirect heating jacket, concentrated solution cooler (L01) of the heat exchanger type; Continuous or semi-continuous pressurized slurry filter (I01); Solvent tank (X01); solvent vapor condenser (J01) of the heat exchanger type; Heat recovery unit (LM01) of the heat exchanger type; Washing solvent feeding pump (Z01); Concentrated solution pump (Z02); solvent pump (Z03); solvent heater (M01); kerosene tank (O01); aluminum crusher (P01), of the cylindrical shear type and with cutting propellers and baffles; flotation tank (Q01) of elongated cylindrical shape and with an air spraying device at the bottom of the tank; screening basket (R01); press (S01) of the piston type; recirculation pump (T01); return pump (V01); and a basket-type drain filter (Y01).

In order to carry out the process for recycling by separating the constituents of aluminized and plastified packaging, cartoned or not, in an intermittent way, the following alternative equipment may be adopted instead of those with similar or complementary function: suspension tank (B02) Of cylindrical shape with conical bottom positioned between the intermittent feeder (B01) and dissolver tank (C01); concentrated solution feeder (N01) and return solvent feeder (N02), both feeder being volumetric of the reciprocating piston type or positive displacement pump type;

For the case of separation of the constituents of aluminized and plastified packaging where the aluminum is isolated in the form of pigment, the same previous steps are adopted, however the stage of isolation of the aluminum should be conducted through filtration and washing of the aluminum with elements having well-closed ceramic pores and executed at the dissolution temperature and the filtrate after cooling undergoes precipitation of the polymer which is conducted to a new filtration with porous element in the slurry filter (I01).

For the specific case of recycling of aluminized, plastified and cartoned packages, the manufacturing process of the present patent takes place in the following steps:

A. Step A: Separation of cellulose from cartoned, aluminized and plastified packaging (ECAP), in the following sequence:

A.a. Packaging shredding resulting in crushed dirty shreds (RTS);

A.b. Washing of the dirty shreds (RTS) with vigorous agitation in water at room temperature and retention of the shreds, separating the water with dirt, which after closed-loop recirculation undergoes filtration and removal of dirt (SRF), returning the recovered water (ARE) for re-use in the wash, and the clean shreds (RTL) with polymeric composition rich in polymer/aluminum, are removed and led to the disintegration step;

A.c. Disaggregation of the shreds (RTL) by shear action obtaining paper pulp which, as the shaking occurs, disintegrate and the cellulose fibers of smaller size and density than the resulting residue, aided further by the vortex formed by the shaking, pass through the screen where they lose speed resulting in a concentrated residue of polymeric composition rich in polymer/aluminum (RPA), substantially free of cellulose, which is directed to the drying step A.d and the cellulose pulp suspension (PC) passing to the outer side of the screen, decants and is removed from the process and is directed to step A.e;

A.d. The residue of polymeric composition rich in polymer/aluminum (RPA) goes to the stage of drying, either indirectly by slightly superheated steam or by saturated steam, or directly by hot air or flue gases (like exhaust gases from a boiler) and once dried, the residue of polymeric composition rich in polymer/aluminum (RPA) goes to the separation and isolation of aluminum and polymer in step B;

A.e. Filtration of the cellulose pulp suspension (PC), where the cellulose pulp (PC) is drained and directed to step A.f and the filtrate, which is cellulose-free filtered water (AFIC), returns to step A.c, constantly recirculating and feeding the disaggregation; And A.f. The cellulose pulp (PC) undergoes partial drying to yield dry cellulose (CES) or is directly to the step of the production of sheets of paper (FPA) or bleached cellulose (CEB).

The process of step A of cellulose separation of cartoned, aluminized and plastified packages (ECAP) is done by using the following equipment in the following sequence:

E.A.a. Shredding of the packages on a mechanical shredder (RME), obtaining dirty shreds (RTS) that go to the step E.A.b;

E.A.b. Washing with filtration on a shreds washing tank with agitation, where the already crushed residue is placed in perforated baskets (CP) and these are introduced into the tank (TLR) with water; Shreds are vigorously shaken with spears directing jets of water under pressure tangentially to the center of the basket causing high shaking of the shreds; The water carrying the dirt is permeated through the basket screen (CP), and by recirculating in closed system passes through a set of dirt removal filters (FRS) separating the recovered water (ARE) to the tank through said spears, the dirt being retained in the set of filters (SRF) and discarded, and the basket (CP) containing the clean shreds (RTL) which are removed and led to step E.A.c.;

E.A.c. Disaggregation of the clean shreds (RTL) in a Hydrapulper-type disaggregator (DHP) consisting of a perforated or screened cylindrical basket (CCF) inside a cylindrical tank of larger diameter and propeller with knife blades located on a fixed base above the basket (CCF) with shaft and propeller inside said basket, through agitation and disaggregation, cellulose fibers of smaller size and density than the resulting residue, further aided by the vortex formed by the agitation, passes through the screen; as the diameter of the basket is much smaller than the diameter of the disaggregator, the cellulose passing through the screen loses speed, in so no longer being affected by the vortex present inside the basket, resulting in the concentrated residue of polymeric composition rich in aluminum/polymer (RPA) substantially free of cellulose which is released from the bottom of the basket (CCF) through an angular valve located at the bottom and the cellulose pulp (PC) on leaving the propeller's field of action, is on the outside of the screen, decants and is removed from the process through the tank bottom valve and is directed to step E.A.e.;

E.A.d. Drying of the residue of polymeric composition rich in aluminum/polymer (RPA) in a inclined rotating screening drum (TTR) with steam with a slight degree of superheating, or by saturated steam, or by hot air or by flue gas (like exhaust gases from a boiler) in which the heating fluid is injected from the inside out of the rotating screening drum (TTR) along its shaft; Once dried, The residue of polymeric composition rich in aluminum/polymer (RPA) goes to the stage of separation of the polymeric composition rich in aluminum/polymer in step B;

E.A.e. Filtration of the cellulose pulp (PC) directing it to a set of hydrocyclones (HC) and thereafter to a screened belt conveyor (TET), consorted with press belts where the cellulose pulp (PC) is drained and directed to step E.A.f. and the filtrate, which is cellulose-free filtered water (AFIC), returns to step E.A.c. by recirculating and constantly feeding in the disaggegator (DHP); and E.A.f. Drying of the cellulose pulp (PC) in conventional dryer (SEC) obtaining dry cellulose (CES) or targeting to receive new quantity of water, being dispersed and fed into a paper machine (PM) for the production of sheets of Paper (FPA) or for bleaching on the bleacher (BR) obtaining bleached cellulose (CEB).

B. Step B: Separation and isolation of aluminum and polymer contained in the residue of the polymeric composition rich in polymer/aluminum (RPA), with the following sequence:

B.a. Dissolution of the residue of polymeric composition rich in polymer/aluminum (RPA) in a solubilizing solvent (SOLV) of the alkanes family of low to medium boiling point (60 to 250° C.), preferably hexane and alternatively kerosene or mineral oil, associated with stirring or movement operating at 100 to 105° C. (in its preferential form with kerosene at 100 ° C.), with concentration of the polymer in the solution during its residence time starting from 2 seconds, with drainage of the polymer-rich concentrated solution (SPC) which is directed to step B.d. and separating the aluminum sheets impregnated with polymer and solvent (FAIP);

B.b. Washing of aluminum sheets (FAIP) impregnated with dissolving solvent (SOLV) and concomitant drainage for removal of the polymer-rich concentrated solution (SPC) that is directed to the step B.d. and separating the aluminum sheets impregnated with solvent (FATS);

B.c. Washing of the aluminum sheets (FATS) with washing solvent (SL) chosen from low-boiling alkanes (petroleum ether) or 96° GL ethanol, among others the dissolving solvent itself (SOLV), with drainage to remove the polymer-rich concentrated solution (SPC) to the step B.d. and with final separation of the aluminum sheets (FA) by drying and evaporation and subsequent condensation of the solvent, which returns as the hot recovered dissolving solvent (SolVQ) to the dissolution process, step B.a.;

B.d. Separation of the solvent from the polymer is obtained by cooling the solution to 50 to 70° C. and separating the polymer from the polymer-rich concentrated solution (SPC) by hot filtration under pressure of 1.0 to 10 bar, with the polymer in slurry form (PFP) going to raise the concentration of the slurry through further filtration, step B.e. and the hot recovered dissolving solvent (SOLVQ) going to further dissolution stage, step B.a.;

B.e. Filtration with washing of the slurry (PFP) under pressure, where most of the residual solvent of the hot recovered dissolving solvent (SOLVQ) is exhaust and returns to the process of dissolution, step B.a. and obtains the resulting cake, with characteristic of a crumbled wet powder impregnated with dissolution solvent;

B.f. If the washing solvent (SL) is not the same as the dissolution solvent, the cake is washed with a small volume of washing solvent (SL), chosen from low boiling alkanes, preferably hexane or ethanol 96 GL which will remove large part of the solvent impregnated in the cake, obtaining the blend of solvents (MDS) and the wet polymer powder (PPU) goes to step B.i.;

B.g. Separation of the small volume of blend of solvents (MDS) by distillation with return of the hot recovered dissolving solvent (SOLVQ) from the bottom of the distillation column for a new dissolution, step B.a., the recovered washing solvent (SLR) from the top of the distillation column returns to a new washing;

B.h. If the dissolving solvent has a low boiling temperature, the impregnated cake is already the wet polymer powder (PPU) with no trace of high boiling solvent; and, B.i. The wet polymer powder (PPU) is dried and the final product dry polymer powder (PPS) is obtained and the residual solvent vapors are condensed and the hot recovered dissolving solvent (SOLVQ) is returned to a new dissolution, step B.a.

The process of step B of separating aluminum from polymer in its preferred form is done using the following equipment in the following sequence:

E.B.a. Dissolution of the Residue of polymeric composition rich in aluminum/polymer (RPA) in an equipment having an inclined trough (CAI) in the form of a ladder with curved lower surface, where the residue (RPA) is fed at the top, in the flow through the trough, total dissolution of the polymer occurs and at the end of the trough the suspension of aluminum in polymer solution falls on a screening conveyor belt (CTL) where the drained solution initially recirculates through the Pump of polymer-rich concentrated solution (BSPC) and through the filter of polymer-rich concentrated solution (FSPC) and at the end draining the polymer-rich concentrated solution (SPC) which is directed to step E.B.d. and separating the aluminum sheets impregnated with polymer and solvent (FAIP);

E.B.b. Washing of the impregnated aluminum sheets (FAIP) on the continuation of the screening conveyor belt (CTL) with a spray of dissolving solvent (SOLV) and concomitant draining of the polymer-rich concentrated solution (SPC) initially by gravity and then by vacuum through the vacuum chamber (CAV) which is directed to the step E.B.d. and separating the aluminum sheets impregnated with solvent (FAIS);

E.B.c. Washing of the aluminum sheets (FATS) in the continuation of the screening conveyor belt (CTL) with the spray of washing solvent (SL) with draining of the polymer-rich concentrated solution (SPC) initially by gravity and then by vacuum through the vacuum chamber (CAV) which is directed to step E.B.d. and separating the aluminum sheets (FA) which are dried in the lower dryer (SEI) heated by low pressure saturated steam and the impregnated solvent is separated by evaporation and subsequent condensation in the solvent condenser (COS), which returns as the hot recovered dissolving solvent (SOLVQ) to the respective dissolution processes, step E.B.a;

E.B.d. Separation of the polymer solvent from the polymer-rich concentrated solution (SPC) by hot ultrafiltration under pressure of 2 to 10 bar, using a ceramic ultrafiltration separator (SU) with the post-cooled polymer in slurry form (PFP) going to the press-filtration, step E.B.e. and the hot recovered dissolution solvent (SOLVQ) going to a new dissolution operation, step E.B.a;

E.B.e. Filtration of the slurry (PFP) that goes to a subsequent filtering by pressing, in a press filter with washing (FPL), where most of the hot recovered dissolving solvent (SOLVQ) is exhausted and returns to the process of dissolution, step E.B.a. and the resulting cake, having the characteristic of a crumbled powder is washed with a small volume of washing solvent (SL), which removes all of the impregnated solvent in the slurry, separately obtaining a small volume of solvent blend (MDS) and wet polymer powder (PPU); And E.B.f. Separation of the small volume of solvent blend (MDS) by distillation in solvent simple distiller (DSS) with return of hot recovered dissolving solvent (SOLVQ) from the bottom of the distiller (DSS) to a new dissolution, step E.B.a., the recovered washer solvent (SLR) from the top of the distiller (DSS) is returned to a new washing and the wet polymer powder (PPU) is dried in a polymer dryer (SEPO) and the final product dry polymer powder (PPS) is obtained, and the residual solvent vapors are condensed in the solvent condenser (COS) and the hot recovered dissolving solvent (SOLVQ) is returned to a new dissolution, step E.B.a.

Carrying out the process of the steps B.a. for separating aluminum from polymer in its first alternative is done using the following equipment in the following sequence:

E.B.a.1. Immersion of the Residue of polymeric composition rich in aluminum/polymer in a dissolving solvent (SOLV) in a screening conveyor belt (CTL), with stirring by means of moving jets of recirculating solvent through a bottom solution filter (F SPC) and a bottom solution recirculating pump (BSPC) with concentration of the polymer in the solution during its residence time, with drainage through the screen, by gravity of the polymer-rich concentrated solution (SPC), letting the aluminum sheets impregnated with polymer and solvent (FAIP) to emerge from the solution, being said aluminum sheets retained and isolated on the screening conveyor belt (CTL).

Alternatively, the process of the steps B.a. of separation of aluminum from polymer in its second alternative is made using the following equipment in the following sequence:

E.B.a.2. Dissolution of the Residue of polymeric composition rich in aluminum/polymer (RPA) with a dissolving solvent (SOLV) in a Hildebrand extractor (EH), with draining by gravity of the polymer-rich concentrated solution (SPC), letting the aluminum sheets be impregnated with polymer and solvent (FAIP) as they emerge from the solution.

The process of the polymer separation steps B.d. in its alternative form is done using the following equipment in the following sequence:

E.B.d.1. Separation of the solvent from the polymer is obtained by cooling the solution at 50 to 70° C. in a heat exchanger (RSTC) and by filtration in a press filter (FFP) at pressures up to 1.5 bar, with the hot recovered dissolving solvent (SOLVQ) at the temperature of about 50 to 70° C. and which is reheated in the solvent heater (AQS) at 100° C. and continues to be reused in a new dissolution step, step B.a. and the polymer in slurry form (PFP) to the press filtration, step B.e.

Alternatively, the realization of the complete process for separation of aluminum from polymer is done through steps E.B. and E.C. using the following equipment and in the following process sequence:

B. Step B. Obtaining of aluminum film (FIA) separated from the polymer-rich solution (SPC) employing solvent with a boiling point in the range of process operating temperature.

E.B.A. Positioning of the residue of polymeric composition rich in aluminum/polymer (RPA) and contained in a perforated basket (CP) inside a dissolution tank (TQD) so that in its position inside the vessel it does not touch the bottom of the vessel, hold on supports in the wall and then the tank is closed; The tank (TQD) has two different heating systems, both fed with saturated steam: the first system consists of a thermosiphon (TSF), so that it can operate with a large volume of solvent (with a boiling point in the range of the temperature of operation of the process) in which the basket is fully immersed, during the dissolution step; and the second system with a steam jacket at the bottom of the tank (so as to be able to operate with a small volume of solvent in which the basket is fully emerged, i.e., above the solvent level during the aluminum washing step, operating as a Soxhlet extractor); it is connected to a reflux condenser (CR) having control of temperature, pressure and water flow in the reflux condenser (which controls the heating steam flow, as well as the reflux condenser feeding water and allows to control the circulation of the termosiphon and the pressure inside the dissolver tank); And has a bottom valve (in order to transfer the solution to the solvent condenser tank (TCS));

E.B.B. Transfer of the dissolving solvent (SOLV) (with a boiling point on the range of the process operating temperature) from the solvent tank (TS) to the dissolution tank (TQD) until fully cover the residue of polymeric composition rich in aluminum/polymer (RPA) contained in the basket (CP) and the dissolution of the polymer-rich polymeric composition is initiated, by feeding steam in the thermosiphon (TSF) connected to the dissolution tank (TQD), occurring the heating and vaporization of the solvent inside the tube bundle, and consequently, displaces a liquid column responsible for the upward displacement of the liquid solvent and its circulation through the shreds of the residue of polymeric composition rich in polymer/aluminum returning to the bottom and re-feeding the tube bundle (creating efficient recirculation, which favors dissolution); The circulation is maintained for 1 to 5 minutes when occurs the partial evaporation of the solvent that is condensed in the Reflux Condenser (CR) returning to the tank and at the end the polymer-rich concentrated solution (SPC) is drained by the bottom valve, passing through the in-line filter (FL) to the solvent condenser tank (TCS) and goes to the step E.B.F. (the high temperature of the solution during the filtration makes this operation easier, because it significantly reduces its viscosity and due to the ratio of the employed solvent, the solution after cooling forms a consistent slurry);

E.B.C. Solvent from the solvent tank (TS) is again transferred to the dissolution tank (TQD) on a level below the bottom of the basket (CP) and the washing is started, now feeding steam to the jacket of the dissolution tank, occurring heating of the solvent contained in the bottom of the vessel, and rising of the vapors, passing through the basket, proceeding to the reflux condenser (CR), said operation being kept at the pressure corresponding to the dissolution temperature and the solvent condensate being kept at a temperature slightly below the saturation temperature percolating through the contents of the basket and which, upon coining into contact with the upward stream of vapors, absorbs heat in a way that, being hot, and on flowing down upon the shreds, wash the residue of solution of polymeric composition rich in polymer that still cover the aluminum, said solution being then transferred to the space below the base of the basket, obtaining complete and continuous washing of aluminum and finally is transferred, with help of internal pressure, the diluted polymer-rich solution (SPD), through the valve at the side of the tank (TQD), to the diluted solution tank (TSD) containing its own reflux condenser, positioned above the tank (TQD) which will feed a new residue of polymeric composition rich in polymer/aluminum, complemented by new or recovered solvent;

E.B.D. Once all liquid solvent has been transferred from the dissolution tank (TQD), after washing, and the bottom outlet of the dissolution tank (TQD) being closed, the vacuum is initially drawn through a vacuum system (SV) which directs the vapor to the reflux condenser (CR) and from there to the atmosphere, and keeping the tank heated with steam in the jacket and then to a purge operation of the residual vapors contained in the dissolution tank, which are drawn by a stream of nitrogen for purge (NPP) to the reflux condenser (CR) and from the condenser to the atmosphere;

E.B.E. After, the dissolution tank (TQD) is opened, the basket (CP) is withdrawn and after removal of the aluminum film (FIA) pieces free from polymer-rich polymeric composition, returns to step E.A.b. and the recovered aluminum is directed to processing in a melting and casting furnace or other stage;

E.B.F. The Polymer-rich concentrated solution (SPC) contained in the condenser tank (TCS) is subjected to heating in order to distil part of the solvent and the vapors are passed to the reflux condenser (CRS) which transfers the hot recovered dissolving solvent (SOLVQ) to the solvent stock tank (TES) which feeds the dissolution tank (TQD) to give the resulting solution (SR) containing polymer-rich polymeric composition with higher viscosity and can then be sent to step E.B.G. or to steps C.1.a., C.2.a., C.3.a., C.4.a. or C.5.a; and E.B.G. The resulting solution (SR) containing polymer-rich polymeric composition with higher viscosity, from which the solvent was partially removed, is subjected to dragging by saturated steam (VAS), which is performed at a temperature close to the softening temperature of the polymer-rich polymeric composition and employing in this operation direct saturated steam (obtaining in this situation more intense and efficient removal of solvent, since the enthalpy of the steam in this condition is elevated) and indirect steam with temperature of the steam injected into the jacket of the tank (TCS) kept close to that of the injected saturated steam (as the vessel is maintained in this operation at atmospheric pressure and the operating temperature is greater than the boiling temperature of the solvent, almost all of it is eliminated); the vapor stream (water and solvent) from this operation flows to a condenser where the condensed water is drained and the solvent vapors exit at the top of this first condenser (CD1), passes to a second condenser (CD2) where condensation of the solvent occurs, flowing, still hot, to the solvent stock tank (TES) which refeed the dissolution tank (TQD) with hot recovered dissolution solvent (SOLVQ) (the storage of the still hot solvent means energy saving in the process); This step has its solvent elimination control adjusted to different processes for recovery of the polymer-rich polymeric solution (SPC), according to its final form; In the form of film, powder or pellets.

C. Step C: obtaining of polymer for reuse:
C.1 In the form of precipitate

E.C.1.a. The resulting solution (SR) containing polymer-rich polymeric composition with higher viscosity is cooled and precipitated in ethanol (AE) under agitation and with indirect cooling in precipitation tank (TPP);

E.C.1.b. The precipitated polymer is filtered through a filter (FIL), separating the obtained powder, then is transferred to a tank with water (TA) where will occur the elimination of the solvents;

E.C.1.c The solvent is removed using direct heating with steam (VA), the dragged solvent vapors are directed to a Condenser (COND) and then to a decantation tank (TDE) to proceed to the separation of the immiscible phase and the supernatant Solvent;

E.C.1.d The aqueous phase is subjected to distillation to separate recovered ethanol (AER) dissolved therein in ethanol distiller (DESA), and the organic phase, which contains a greater quantity of the dissolving solvent is further distilled in the dissolving solvent distiller (DESH), recovering from this mixture the dissolving solvent (SOLVQ) and also a little of ethanol partitioned and in equilibrium with the dissolution solvent in a phase equilibrium; and E.C.1.e. The resulting polymer is filtered in the filter (FIL) and dried in a conventional dryer (SEC) to give the dry precipitated polymer (PPS).

In the case of packages made only with non-paper aluminized polymer films and containing polypropylene and polyethylene, the same procedures as in steps B and C (post-extraction of cellulose), i.e. recovery of the polymer/aluminum residue as in the previous case, are followed. The only difference being the operating temperature. If conducted at 100° C., only the polyethylene is dissolved and the polypropylene is insoluble. In this condition, the hot solution is filtered and the undissolved solid components, polypropylene and aluminum are washed, after washing with petroleum ether and subsequently with ethanol, dispersed in a liquid to a low cut crusher grinding system, a kind of blind blender. Said liquid may be, for example, ethanol. In this condition, the aluminum will be crushed leaving the polypropylene in a larger size, thus allowing easy separation by sieve filtration.

The process can still be optimized for energy consumption, if all the recovery chain is taken in consideration, whether it be separation of the pulp from paper, polymer and aluminum, by recovering heat between all phases of the process, for example by using the exhaust gases from boiler (chimney) outlet ~250° C. to the drying tower or drying belt of the polymer after evaporation of the washing solvent. In case of aluminum melting, cooling of the ingots could be performed in a chamber whose hot gases from the cooling would recover heat from the aluminum and could be conducted either to heat part of the solvents or even to be used for general drying, either of the composite films after elimination of the cellulose, before entering the solubilization process, or drying of the pulverized polymer after elimination of the washing solvent. This is in fact feasible because there would have hot gases with initial temperature of 650 ° C. and final temperature in the range of 105° C.

The invention claimed is:

1. A process for recycling by separating the constituents of aluminized and plastic packaging, cartoned or not, comprising separating the constituents of polyethylene or polypropylene plastic film with aluminum by solubilizing the polymer in a compatible primary solvent, operation performed below the polymer softening temperature and under pressure followed by insolubilization via reduction of temperature, separation of the solvent from the polymer and finally filtration and reuse of the solvent in the step of solubilization, in the following sequence:

A) Feeding of small shreds of film or equivalent in an intermittent way, through the film doser (A01), passing through a locking valve (U01) at the inlet of the intermittent feeder (B01) and from it through another locking valve (U02) at the inlet of the continuous feeder (B01A);

B) Dosing of a predetermined quantity of film from the intermittent feeder (B01) with the valve (U01) blocked and the valve (UO2) open, transferring the film to a continuous feeder (B01A); the valve (U02) is blocked and the valve (U01) is unlocked and film is re-fed from the doser (A01) into the intermittent feeder (B01), and so on;

C) Film from the continuous feeder (B01A) is fed through its internal conveyor thread, concomitant with the solvent inlet, into the suspension tank (B02) with the valve (U02) blocked, with continuous volumetric feed of solvent through the solvent feeding pump (Z01) in a ratio of 8 to 15 parts of solvent to one part of film, so as to cover the entire film content in the suspension tank (B02) and formation of a suspension of the polymer/aluminum film in solvent;

D) Feeding of the suspension in the dissolver tank (C01) where the suspension is rotated by a profile in the shape of an internal helical pitch and heating at 100 to 105° C. in an indirect way and with greater circulation, agitation and consequent movement for better convection, with a residence time of 2 to 5 seconds;

E) At the end of the dissolution, the liquid stream with the solution of polymer and aluminum in suspension, enters a special screen filter (D01) carried by a helical thread, which conducts the aluminum through the filtration operation and separates the concentrated solution;

F) The concentrated solution crosses the walls of the screen maintaining a counter pressure to the fluid in the solution outlets to keep the dissolver tank (C01) pressurized and is collected in the concentrated solution tank (F01) and the aluminum with residual polymer flows, pushed by the thread of the filter (D01), to another contiguous compartment, the residual polymer washing tank (E01) and immediately before and after the wall communicating the two compartments, the duct no longer allows passage through its surface and by using different speed the aluminum is driven to the special aluminum output device (G10) out of the system;

G) In the residual polymer washer tank (E01), filtered and condensed solvent is injected from the solvent tank (X01), through the inside of the helical screw thread of the tank (E01), to remove residual polymer solution from aluminum and the diluted solution crosses the screen maintaining a counter pressure to the fluid in the solution outlets to maintain pressurized the dissolver tank (C01) and is collected in the diluted solution tank (F02);

H) The concentrated solution, after reaching the steady state, is collected in the concentrated solution tank (F01) and transferred continuously by the concentrated solution pump (Z02) for cooling between 50 and 70° C., initially in the heat recovering unit (LM01) to yield heat to the filtered and condensed solvent, and additionally to the concentrated solution cooler (L01) in order to precipitate and insolubilize the polymer, then to filtrate into the slurry filter (I01), from which the filtered solvent is accumulated, together with solvent from the condenser (J01) into the solvent tank (X01) and returning through the heat recovery unit (LM01), the solvent pump (Z03), the solvent heater (M01) and the shaft of helical thread of the residual polymer washing tank (E01);

I) The diluted solution from the washing of the aluminum in the residual polymer washing tank (E01) is collected in the diluted solution tank (F02) and return to the beginning of the process continuously through the washing solvent feeding pump (Z01);

J) The cake after filtration goes to drying in the polymer dryer (H01) and the solvent vapors proceed to the condenser (J01) and the resulting condensed solvent is mixed with the condensed solvent coming from the aluminum dryer (K01);

L) All solvent vapor streams, after condensate, proceed to the solvent tank (X01), are reused for washing the aluminum and from there to the beginning of the process;

M) Aluminum is intermittently removed through a special intermittent, rotating and reciprocating vertical opening and closing aluminum output device (G10) in order to also keep the pressure inside the dissolver tank (C01) and the aluminum from which the polymer was removed is conducted for drying in the dryer (K01), the solvent vapors being separated to the condenser (J01), where its stream is mixed with the condensed solvent from the polymer dryer (H01);

O) Dry aluminum containing small amounts of cellulosic fibers and pieces of unremoved lids, as well as polypropylene tapes, in batch process, are fed into a crusher tank (P01), kerosene is added at room temperature and shear crushing is carried out, not only removing the polymer residual, but also loosing all the residual cellulosic fibers;

P) The agitation is then turned off and the aluminum suspension is transferred to the flotation tank (Q01), air is sprayed through the device contained in the bottom of the crushing tank (P01), occurring the formation of foam which carries fibers and shreds of polypropylene and cellulosic fibers;

Q) This foam is continuously removed by the draining of the supernatant liquid stream, foam passing through a screen basket (R01), where the light particulates of polypropylene and fiber will be retained, then returning the kerosene to the tank, by pumping through the recirculation pump (T01) to the tank bottom; and R) The aluminum suspension, after the impurities are eliminated, is drained by a filter (Y01), the kerosene is pumped by the return pump (V01) and returns to the kerosene tank (O01) which will feed the next batch and the aluminum goes for pressing in the press (S01) to remove most of the kerosene, which goes to the melting stage, where evaporation of the remainder of retained kerosene takes place.

2. The process according to claim 1, wherein the insolubilization of the polymer taking place by incorporating a secondary solvent with affinity with the primary solvent, and not solvent of the polymer.

3. The process according to claim 1, wherein the process is intermittent and realized according to the following steps:

A) Feeding of small shreds of film or equivalent in an intermittent way through the film doser (A01), passing through a locking valve (U01) at the inlet of the intermittent feeder (B01) and from it through another locking valve (UO2) at the inlet of the suspension tank (B02);

B) Once the valve (U01) is blocked between the film doser (A01) and the intermittent feeder (B01), the film is dosed concomitantly with the solvent feed in the suspension tank (B02) and with each intermediate tank feed (B01), the valve (U02) between it and the suspension tank (B02) is held closed;

C) Intermittent volumetric feed of concentrated solution through the concentrated solution feeder (N01) and washing solvent through the return solvent feeder (N02) effected by positive displacement, the first working only until entry into steady state, in a ratio of 8 to 15parts of solvent to one part of film, so as to cover the entire film content in the suspension tank (B02) and formation of a suspension of the polymer/aluminum film in solvent;

H) The concentrated solution, after reaching the steady state, is collected in the concentrated solution tank (F01) and transferred intermittently by the concentrated solution feeder (N03) for cooling between 50 and 70° C., initially in the heat recovery unit (LM01) to give heat to the filtered and condensed solvent, and is further cooled in the concentrated solution cooler (L01) in order to precipitate and insolubilize the polymer, then goes to filtrate in the slurry filter (I01), from which the filtered solvent is accumulated together with solvent coming from the condenser (J01) into the solvent tank (X01) and returns through the heat recovery unit (LM01), through the solvent feeder (N04) intermittently, through the solvent heater (M01) and by the shaft of the helical thread of the residual polymer washer tank (E01); and I) The diluted solution from the washing of the aluminum in the residual polymer washing tank (E01) is collected in the diluted solution tank (F02) and returned to the beginning of the process intermittently through the return solvent feeder (NO2).

4. Equipment, in order to carry out the process for recycling by separating the constituents of aluminized and plastified packaging, cartoned or not, according to claim 1, wherein film doser (A01), volumetric, of the rotary valve type or similar, intermittent feeder (B01) of cylindrical shape and conical bottom, placed between the continuous feeder (B01A) and the film doser (A01) and with the diaphragm type locking valve (U01) at the inlet; Continuous feeder (B01A) of cylindrical shape and conical bottom with internal conveyor thread, with diaphragm-type locking valve (UO2) at the inlet and with tangential solvent feed connection; dissolver tank (C01) with cylindrical section and heating jacket, having in its interior, along its vertical section, a fixed helical pitch involving all the circular transverse section; special screening filter (D01) conical-shaped, fitted with a conical helical thread adjusted to the wall of the screen and check valve at the outlet to the concentrated solution tank (F01) and communicating with the residual polymer washer tank (E01) through non-screening duct leading to the other compartment; residual polymer washer tank (E01) of screened duct of cylindrical configuration and with a larger cross-section and containing inside it a cylindrical helical thread with perforations on its shaft and check valve at the outlet to the diluted solution tank (F02); concentrated solution tank (F01); diluted solution tank (F02); special aluminum output device (G10) rotating and pulsatile with plunger (G11) which moves inside a cylindrical jacket (G12) with top opening (G12A) connecting to the pressurized system, and another bottom opening (G12B) located below, said bottom opening (G12B) distant from the top opening (G12A) by a length a little larger than the height of the top opening and 180 degrees out of the top opening and in communication with external means, the plunger (G11) has a cavity (G11A) of semi-cylindrical shape with the lower cut inclined at 45 degrees and delimited by three top sealing rings and three other equidistant rings below, situated at a distance a little larger than the corresponding height of the cavity; Polymer dryer (H01) of conveyor thread type with indirect heating; aluminum dryer (K01) of the conveyor thread type with indirect heating jacket; concentrated solution cooler (L01) of the heat exchanger type; continuous pressurized slurry filter (I01); solvent tank (X01); solvent vapor condenser (J01) of the heat exchanger type; heat recovery unit (LM01) of the heat exchanger type; Washing solvent feeding pump (Z01) of the pump type; Concentrated solution pump (Z02); solvent pump (Z03); solvent heater (M01); kerosene tank (O01); aluminum crusher (P01), of the cylindrical shear type and with cutting propellers and baffles; flotation tank (Q01) of elongated cylindrical shape and with an air spraying device at the bottom of the tank; screen basket (R01); press (S01) of the piston type; recirculation pump (T01); return pump (V01); and a basket-type drain filter (Y01).

5. Equipment, in order to carry out the process for recycling by separating the constituents of aluminized and plastified packaging, cartoned or not, in an intermittent way, according to claim 3, wherein suspension tank (B02) has a cylindrical shape with conical bottom positioned between the intermittent feeder (B01) and dissolver tank (C01); concentrated solution feeder (N01) and return solvent feeder (N02), both feeder being volumetric of the reciprocating piston type.

6. A process for recycling by separating the constituents of aluminized and plastified packaging, with separation of the constituents of aluminized and plastified packaging where the aluminum is isolated in the form of pigment, according to claim 1, wherein, filtration and washing of the aluminum with elements having well-closed ceramic pores and executed at the dissolution temperature and the filtrate after cooling undergoing precipitation of the polymer and being conducted to a new filtration with porous element in the slurry filter (I01).

7. Equipment, in order to carry out the process for recycling by separating the constituents of aluminized and plastified packaging, where the aluminum is isolated in the form of pigment, according to claim 6, wherein the filter (I01) is ceramic.

8. A process for recycling by separating the constituents of aluminized, plastified and cartoned packaging comprising:
   A. Step A: Separation of cellulose from cartoned, aluminized and plastified (ECAP) packaging, in the following sequence:
      A.a Shredding of the packages resulting in crushed dirty shreds (RTS);
      A.b Washing of the dirty shreds (RTS) with vigorous agitation in water at room temperature and retention of the shreds, separating the water with dirt, which after closed-loop recirculation undergoes filtration and removal of dirt (SRF), returning the recovered water (ARE) for re-use in the washing, and the clean shreds (RTL) with polymeric composition rich in polymer/aluminum, are removed and led to the disaggregation step;
      A.c Disaggregation of the shreds (RTL) by shear action obtaining paper pulp which, as the shaking occurs, disintegrate and the cellulose fibers of smaller size and density than the resulting residue, aided further by the vortex formed by the shaking, pass through the screen where they lose speed resulting in a concentrated residue of polymeric composition rich in polymer/aluminum (RPA), substantially free of cellulose, which is directed to the A.d drying step and the cellulose pulp suspension (PC) passing to the outer side of the screen, decants and is removed from the process and is directed to step A.e;
      A.d The residue of polymeric composition rich in polymer/aluminum (RPA) goes to the stage of drying, either indirectly by slightly superheated steam or by saturated steam, or directly by hot air or combustion flue gases and once dried, the residue of polymeric composition rich in polymer/aluminum (RPA) goes to the separation and isolation of aluminum and polymer in step B;
      A.e Filtration of the cellulose pulp suspension (PC), where the cellulose pulp (PC) is drained and directed to step A.f and the filtrate, which is cellulose-free filtered water (AFIC), returns to step A.c, constantly recirculating and feeding the disaggregation; And
      A.f The cellulose pulp (PC) undergoes partial drying to yield dry cellulose (CES) or is led directly to the step of the production of sheets of paper (FPA) or bleached cellulose (CEB); and B. Step B: Separation and isolation of aluminum and polymer contained in the residue of the polymeric composition rich in polymer/aluminum (RPA), with the following sequence:

B.a. Dissolution of the residue of polymeric composition rich in polymer/aluminum (RPA) in a solubilizing solvent (SOLV) of the alkanes family of low to medium boiling point in liquid state independently of its boiling point, associated with stirring or movement, operating at 100 to 105° C., below the softening temperature of the polymer, at atmospheric pressure or at pressure higher than atmospheric pressure when the solvent has low boiling point, with concentration of the polymer in the solution during its residence time starting from 2 seconds, with drainage of the polymer-rich concentrated solution (SPC) which is directed to step B.d. and separating the aluminum sheets impregnated with polymer and solvent (FAIP);

B.b. Washing of impregnated aluminum sheets (FAIP) with dissolving solvent (SOLV) and concomitant drainage for removal of the polymer-rich concentrated solution (SPC) that is directed to the step B.d. and separating the aluminum sheets impregnated with solvent (FATS);

B.c. Washing of the aluminum sheets (FATS) with washing solvent (SL) chosen from low-boiling point alkanes among others the dissolving solvent itself (SOLV), with drainage to remove the polymer-rich concentrated solution (SPC) to the step B.d. and with final separation of the aluminum foil (FA) by drying and evaporation and subsequent condensation of the solvent, which returns as the hot recovered dissolving solvent (SOLVQ) to the dissolution process, step B.a.;

B.d. Separation of the solvent from the polymer is obtained by cooling the solution to 50 to 70° C. and separating the polymer from the polymer-rich concentrated solution (SPC) by hot filtration under pressure of 1.0 to 10 bar, with the concentrated polymer in slurry form (PFP) going to raise the concentration of the slurry through further filtration, step B.e. and the hot recovered dissolving solvent (SOLVQ) going to further dissolution stage, step B.a.;

B.e. Filtration with washing of the slurry (PFP) under pressure, where most of the residual solvent of the hot recovered dissolving solvent (SOLVQ) is exhaust and returns to the process of dissolution, step B.a. and the resulting cake, with characteristic of a crumbled wet powder impregnated with dissolution solvent;

B.f. If the washing solvent (SL) is not the same as the dissolving solvent, the cake is washed with a small volume of washing solvent (SL), chosen from low boiling alkanes, or 96° GL ethanol which will remove large part of the solvent impregnated in the cake, obtaining the blend of solvents (MDS) and the wet polymer powder (PPU) goes to step B.i., B.g. Separation of the small volume of blend of solvents (MDS) by distillation with return of the hot recovered dissolving solvent (SOLVQ) from the bottom of the distillation column for a new dissolution, step B.a., the recovered washing solvent (SLR) from the top of the distillation column returns to a new washing;

B.h. If the dissolving solvent has a low boiling temperature, the impregnated cake is already the wet polymer powder (PPU) with no trace of high boiling solvent;

B.i. The wet polymer powder (PPU) is dried and the final dry polymer powder (PPS) product is obtained and the residual solvent vapors are condensed and the hot recovered dissolving solvent (SOLVQ) is returned to a new dissolution, step B.a.

9. The process according to claim 8, wherein the dissolving solvent (SOLV) has a boiling point preferably above 60° C.

10. The process according to claim 8, wherein the dissolving solvent is hexane.

11. The process according to claim 8 wherein the dissolving solvent is kerosene or mineral oil.

12. The process according to claim 8, wherein the dissolution occurs at a temperature from 100 to 105° C.

13. The process according to claim 8, wherein the washing solvent (SL) is hexane.

14. The process according to claim 8, wherein the washing solvent (SL) is ethanol 96° GL.

15. An operation process, in order to carry out the step B, contained on the claim 8, wherein the following equipment:

E.B.a. Dissolution of the Residue of polymeric composition rich in aluminum/polymer (RPA) in an equipment having an inclined trough (CAI) in the form of a ladder with curved lower surface, where the residue (RPA) is fed at the top, in the flow through the trough, total dissolution of the polymer occurs and at the end of the trough the suspension of aluminum in polymer solution falls on a screening conveyor belt (CTL) where the drained solution initially recirculates through the pump of polymer-rich concentrated solution (BSPC) and through the filter of polymer-rich concentrated solution (FSPC) and at the end draining the polymer-rich concentrated solution (SPC) which is directed to step E.B.d. and separating the aluminum sheets impregnated with polymer and solvent (FAIP);

E.B.b. Washing of the impregnated aluminum sheets (FAIP) on the continuation of the screening conveyor belt (CTL) with a spray of dissolving solvent (SOLV) and concomitant draining of the polymer-rich concentrated solution (SPC) initially by gravity and then by vacuum through the vacuum chamber (CAV) which is directed to the step E.B.d. and separating the aluminum sheets impregnated with solvent (FAIS);

E.B.c. Washing of the aluminum sheets (FAIS) in the continuation of the screening conveyor belt (CTL) with the spray of washing solvent (SL) with draining of the polymer-rich concentrated solution (SPC) initially by gravity and then by vacuum through the vacuum chamber (CAV) which is directed to step E.B.d. and separating the aluminum sheets (FA) which are dried in the lower dryer (SEI) heated by low pressure saturated steam and the impregnated solvent is separated by evaporation and subsequent condensation in the solvent condenser (COS), which returns as the hot recovered dissolving solvent (SOLVQ) to the respective dissolution processes, step E.B.a;

E.B.d. Separation of the polymer solvent from the polymer-rich concentrated solution (SPC) by hot ultrafiltration under pressure of 2 to 10 bar, using a ultrafiltration separator (SU) with the post-cooled polymer in slurry form (PFP) going to the press-filtration, step E.B.e. and the hot recovered dissolution solvent (SOLVQ) going to a new dissolution operation, step E.B.a;

E.B.e. Filtration of the slurry (PFP) that goes to a subsequent filtering by pressing, in a press filter with washing (FPL), where most of the hot recovered dissolving solvent (SOLVQ) is exhausted and returns to the process of dissolution, step E.B.a. and the resulting cake, having the characteristic of a crumbled powder is washed with a small volume of washing solvent (SL), which removes all of the impregnated solvent in the slurry, separately obtaining a small volume of solvent blend (MDS) and wet polymer powder (PPU); and E.B.f. Separation of the small volume of solvent blend (MDS) by distillation in solvent simple distiller (DSS) with return of hot recovered dissolving solvent (SOLVQ) from the bottom of the distiller (DSS) to a new dissolution, step E.B.a., the recovered washer solvent (SLR) from the top of the distiller (DSS) is returned to a new washing and the wet polymer powder (PPU) is dried in a polymer dryer (SEPO) and the final dry polymer powder (PPS) is obtained, and the residual solvent vapors are condensed in the solvent condenser (COS) and the hot recovered dissolving solvent (SOLVQ) is returned to a new dissolution, step E.B.a.

16. An operation process, in order to carry out the step B.a., contained in claim 8, wherein, first alternative, the following equipment:

E.B.a.1. Immersion of the Residue of polymeric composition rich in aluminum/polymer in a dissolving solvent (SOLV) in a screening conveyor belt (CTL), with stirring by means of moving jets of recirculating solvent through a bottom solution filter (FSPC) and a bottom solution recirculating pump (BSPC) with concentration of the polymer in the solution during its residence time, with drainage through the sieve, by gravity of the polymer-rich concentrated solution (SPC), letting the aluminum sheets impregnated with polymer and solvent (FAIP) to emerge from the solution, being said aluminum sheets retained and isolated on the screening conveyor belt (CTL).

17. An operation process, in order to carry out the step B.a., contained in claim 8, wherein, second alternative, the following equipment:

E.B.a.2 Dissolution of the Residue of polymeric composition rich in aluminum/polymer (RPA) with a dissolving solvent (SOLV) in a Hildebrand extractor (EH), with draining by gravity of the polymer-rich concentrated solution (SPC), letting the aluminum sheets be impregnated with polymer and solvent (FAIP) as they emerge from the solution.

18. An operation process, in order to carry out the step B.d., contained in claim 8, wherein, in its alternative form, the following equipment:

E.B.d.1. Separation of the solvent from the polymer is obtained by cooling the solution in a heat exchanger (RSTC) and by filtration in a press filter (FFP) and which is reheated in the solvent heater (AQS).

19. An operation process, in order to carry out the complete process of separating the aluminum in its alternative form, through the steps E.B. and E.C., according to claim 8, wherein, the following equipment:

B. Step B. Obtaining of aluminum film (FIA) separated from the polymer-rich solution (SPC):

E.B.A. Positioning of the residue of polymeric composition rich in aluminum/polymer (RPA) and contained in a perforated basket (CP) inside a dissolution tank (TQD) so that in its position inside the vessel it does not touch the bottom of the vessel, hold on supports in the wall and then the tank is closed; The tank (TQD) has two different heating systems, both fed with saturated steam: the first system consists of a thermosiphon (TSF); and the second system with a steam jacket at the bottom of the tank; it is connected to a reflux condenser (CR) having control of temperature, pressure and water flow in the reflux condenser and has a bottom valve;

E.B.B. Transfer of the dissolving solvent (SOLV) with temperature in the range of 100-105° C. from the solvent tank (TS) to the dissolution tank (TQD) until fully cover the residue of polymeric composition rich in aluminum/polymer (RPA) contained in the basket (CP) and the dissolution of the polymer-rich polymeric composition is initiated, by feeding steam in the thermosiphon (TSF) connected to the dissolution tank (TQD), occurring the heating and vaporization of the solvent inside the tube bundle, and consequently, displaces a liquid column responsible for the upward displacement of the liquid solvent and its circulation through the shreds of the residue of polymeric composition rich in polymer/aluminum returning to the bottom and re-feeding the tube bundle; The circulation is maintained for 1 to 5 minutes when occurs the partial evaporation of the solvent that is condensed in the reflux condenser (CR) returning to the tank and at the end the polymer-rich concentrated solution (SPC) is drained by the bottom valve, passing through the in-line filter (FL) to the solvent condenser tank (TCS) and goes to the step E.B.F;

E.B.C. Solvent from the solvent tank (TS) is again transferred to the dissolution tank (TQD) on a level below the bottom of the basket (CP) and the washing is started, now feeding steam to the jacket of the dissolution tank, occurring heating of the solvent contained in the bottom of the vessel, and rising of the vapors, passing through the basket, proceeding to the reflux condenser (CR), said operation being kept at the pressure corresponding to the dissolution temperature and the solvent condensate being kept at a temperature slightly below the saturation temperature percolating through the contents of the basket and which, upon coming into contact with the upward stream of vapors, absorbs heat in a way that, being hot, and on flowing down upon the shreds, wash the residue of solution of polymeric composition rich in polymer that still cover the aluminum, said solution being then transferred to the space below the base of the basket, obtaining complete and continuous washing of aluminum and finally is transferred, with help of internal pressure, the diluted polymer-rich solution (SPD), through the valve at the side of the tank (TQD), to the diluted solution tank (TSD) containing its own reflux condenser, positioned above the tank (TQD) which will feed a new residue of polymeric composition rich in polymer/aluminum, complemented by new or recovered solvent;

E.B.D. Once all liquid solvent has been transferred from the dissolution tank (TQD), after washing, and the bottom outlet of the dissolution tank (TQD) being closed, the vacuum is initially drawn through a vacuum system (SV) which directs the vapor to the reflux condenser (CR) and from there to the atmosphere, and keeping the tank heated with steam in the jacket and then to a purge operation of the residual vapors contained in the dissolution tank, which are drawn by a stream of nitrogen for purge (NPP) to the reflux condenser (CR) and from the condenser to the atmosphere;

E.B.E. After, the dissolution tank (TQD) is opened, the basket (CP) is withdrawn and after removal of the aluminum film (FIA) pieces free from polymer-rich polymeric composition, returns to step E.A.b. and the recovered aluminum is directed to processing in a melting and casting furnace or other stage;

E.B.F. The Polymer-rich concentrated solution (SPC) contained in the condenser tank (TCS) is subjected to heating in order to distil part of the solvent and the vapors are passed to the reflux condenser (CRS) which transfers the hot recovered dissolving solvent (SOLVQ) to the solvent stock tank (TES) which feeds the dissolution tank (TQD) to give the resulting solution (SR) containing polymer-rich polymeric composition with higher viscosity and can then be sent to step E.B.G. or to steps C.1.a., C.2.a., C.3.a., C.4.a. or C.5.a; and E.B.G. The resulting solution (SR) containing polymer-rich polymeric composition with higher viscosity, from which the solvent was partially removed, is subjected to dragging by saturated steam (VAS), which is performed at a temperature close to the softening temperature of the polymer-rich polymeric composition and employing in this operation direct saturated steam and indirect steam with temperature of the steam injected into the jacket of the tank (TCS) kept close to that of the injected saturated steam; the vapor stream from this operation flows to a condenser where the condensed water is drained and the solvent vapors exit at the top of this first condenser (CD1), passes to a second condenser (CD2) where condensation of the solvent occurs, flowing, still hot, to the solvent stock tank (TES) which refeed the dissolution tank (TQD) with hot recovered dissolution solvent (SOLVQ); This step has its solvent elimination control adjusted to different processes for recovery of the polymer-rich polymeric solution (SPC), according to its final form; in the form of film, powder or pellets.

20. The process according to claim 19, wherein, realization of step E.C., in its alternative form, using the following equipment:

C.1 In the form of precipitate

E.C.1.a. The resulting solution (SR) containing polymer-rich polymeric composition with higher viscosity is cooled and precipitated in ethanol (AE) under agitation and with indirect cooling in precipitation tank (TPP);

E.C.1.b. The precipitated polymer is filtered through a filter (FIL), separating the obtained powder, then is transferred to a tank with water (TA) where will occur the elimination of the solvents;

E.C.1.c The solvent is removed using direct heating with steam (VA), the dragged solvent vapors are directed to a condenser (COND) and then to a decantation tank (TDE) to proceed to the separation of the immiscible phase and the supernatant solvent;

E.C.1.d The aqueous phase is subjected to distillation to separate recovered ethanol (AER) dissolved therein in ethanol distiller (DESA), and the organic phase, which contains a greater quantity of the dissolving solvent is further distilled in the dissolving solvent distiller (DESH), recovering from this mixture the dissolving solvent (SOLVQ) and also a little of ethanol partitioned and in equilibrium with the dissolving solvent in a phase equilibrium; and E.C.1.e. The resulting polymer is filtered in the filter (FIL) and dried in a conventional dryer (SEC) to give the dry precipitated polymer (PPS).

* * * * *